United States Patent
Park et al.

(10) Patent No.: US 12,032,266 B2
(45) Date of Patent: Jul. 9, 2024

(54) PHASE MODULATOR AND PHASE MODULATOR ARRAY INCLUDING THE SAME

(71) Applicants: SAMSUNG ELECTRONICS CO., LTD., Suwon-si (KR); The Board of Trustees of the Leland Stanford Junior University, Stanford, CA (US)

(72) Inventors: Junghyun Park, Seoul (KR); Yifei Wang, Stanford, CA (US); Mark L. Brongersma, Stanford, CA (US)

(73) Assignees: SAMSUNG ELECTRONICS CO., LTD., Suwon-si (KR); The Board of Trustees of the Leland Stanford Junior University, Stanford, CA (US)

( * ) Notice: Subject to any disclaimer, the term of this patent is extended or adjusted under 35 U.S.C. 154(b) by 444 days.

(21) Appl. No.: 17/371,821

(22) Filed: Jul. 9, 2021

(65) Prior Publication Data
US 2022/0013905 A1 Jan. 13, 2022

Related U.S. Application Data

(60) Provisional application No. 63/049,903, filed on Jul. 9, 2020.

(30) Foreign Application Priority Data

Mar. 23, 2021 (KR) .................. 10-2021-0037549
May 12, 2021 (KR) .................. 10-2021-0061637

(51) Int. Cl.
*G02F 1/01* (2006.01)
*G02F 1/29* (2006.01)
(Continued)

(52) U.S. Cl.
CPC ............ *G02F 1/292* (2013.01); *G02F 1/0147* (2013.01); *H01Q 3/36* (2013.01); *H01Q 3/46* (2013.01);
(Continued)

(58) Field of Classification Search
CPC .... G02F 1/0147; G02F 1/292; G02F 2203/10; G02F 2203/50; H01Q 3/36; H01Q 3/46; H04B 7/0617; H04B 10/548
See application file for complete search history.

(56) References Cited

U.S. PATENT DOCUMENTS 8,711,463 B2    4/2014   Han et al.
9,482,887 B2 *  11/2016  Horie ................... G02F 1/0107
(Continued)

FOREIGN PATENT DOCUMENTS

KR   10-2018-0082305 A   7/2018
KR   10-2020-0052207 A   5/2020
WO       2019/134488 A1   7/2019

OTHER PUBLICATIONS

Huang, Yao-Wei et al., "Gate-Tunable Conducting Oxide Metasurfaces", Nano Letters, Aug. 26, 2016, vol. 16, pp. 5319-5325.
(Continued)

*Primary Examiner* — Ryan A Lepisto
(74) *Attorney, Agent, or Firm* — Sughrue Mion, PLLC

(57) ABSTRACT

Provided is a phase modulator including an antenna pattern, a lower reflective layer spaced apart from the antenna pattern in a vertical direction, a spacer provided between the antenna pattern and the lower reflective layer, and a phase shift pattern included in the spacer, the phase shift pattern including a phase shift material.

20 Claims, 23 Drawing Sheets

(51) Int. Cl.
*H01Q 3/36* (2006.01)
*H01Q 3/46* (2006.01)
*H04B 7/06* (2006.01)
*H04B 10/548* (2013.01)

(52) U.S. Cl.
CPC ......... *H04B 7/0617* (2013.01); *H04B 10/548* (2013.01); *G02F 2203/10* (2013.01); *G02F 2203/50* (2013.01)

(56) References Cited

U.S. PATENT DOCUMENTS

| | | | |
|---|---|---|---|
| 9,632,216 B2* | 4/2017 | Han | G02B 5/008 |
| 9,711,697 B2* | 7/2017 | Vassant | H01L 33/06 |
| 9,817,250 B2* | 11/2017 | Han | G02F 1/015 |
| 9,958,707 B2* | 5/2018 | Atwater | G02F 1/0121 |
| 10,012,851 B2* | 7/2018 | Han | G02F 1/0147 |
| 10,199,415 B2 | 2/2019 | Akselrod et al. | |
| 10,234,743 B2* | 3/2019 | Kim | G02F 1/0018 |
| 10,254,448 B2* | 4/2019 | Lee | G02F 1/292 |
| 10,303,038 B2* | 5/2019 | Kim | G02F 1/133602 |
| 10,670,941 B2* | 6/2020 | Park | G02F 1/29 |
| 10,705,406 B2* | 7/2020 | Kim | G01S 7/4817 |
| 10,824,043 B2* | 11/2020 | Park | G02F 1/0102 |
| 10,901,149 B2* | 1/2021 | Kim | G02F 1/292 |
| 10,989,936 B2* | 4/2021 | Kim | G01S 7/4817 |
| 11,009,769 B2* | 5/2021 | Park | G01S 7/4817 |
| 11,070,775 B2* | 7/2021 | Lee | G02B 5/3083 |
| 11,237,452 B2* | 2/2022 | Kyoung | G02F 1/292 |
| 11,513,219 B2* | 11/2022 | Lee | G01S 17/02 |
| 2018/0059505 A1 | 3/2018 | Kyoung et al. | |
| 2018/0196137 A1* | 7/2018 | Lee | G01S 7/481 |
| 2019/0018299 A1 | 1/2019 | Park et al. | |
| 2019/0033682 A1* | 1/2019 | Kafaie Shirmanesh | G02F 1/29 |
| 2019/0204492 A1 | 7/2019 | Park et al. | |
| 2019/0235228 A1 | 8/2019 | Chou et al. | |
| 2020/0081275 A1 | 3/2020 | Kim et al. | |
| 2020/0183148 A1 | 6/2020 | Park et al. | |
| 2020/0266553 A1 | 8/2020 | Cao et al. | |
| 2021/0240052 A1* | 8/2021 | Uenoyama | G02F 1/355 |

OTHER PUBLICATIONS

Kim, Yonghwi et al., "Phase Modulation with Electrically Tunable Vanadium Dioxide Phase-Change Metasurfaces", Nano Letters, May 28, 2019, vol. 19, pp. 3961-3968.

Park, Junghyun et al., "Dynamic Reflection Phase and Polarization Control in Metasurfaces", Nano Letters, Dec. 5, 2016, vol. 17, pp. 407-413.

Park, Junghyun et al., "An Over-Coupled Phase-Change Metasurface for Efficient Reflection Phase Modulation", Advanced Optical Materials, 2020, vol. 8, 200745. (8 pages total).

Wang, Yifei et al., "Electrical tuning of phase-change antennas and metasurfaces", Nature Nanotechnology, Jun. 2021, vol. 16, pp. 667-672.

Horie, Yu et al., "High-Speed, Phase-Dominant Spatial Light Modulation with Silicon-Based Active Resonant Antennas", ACS Photonics, Nov. 8, 2017, vol. 5, pp. 1711-1717.

Wang, Youmin et al., "2D broadband beamsteering with large-scale MEMS optical phased array", Optica, May 2019, vol. 6, No. 5, pp. 557-562.

Zhou, Guangya et al., "Nondispersive optical phase shifter array microlestromechanical systems based gratings", Optics Express, Aug. 20, 2007, vol. 15, No. 17, pp. 10958-10963.

Sajjad Abdollahramezani et al., "Electrically programmable phased-array antenna using phase-change materials", Conference on Lasers and Electro-Optics (CLEO), 2020, 2 pages total, XP033823981.

Weiwei Hu et al., "Progress and Prospects of Silicon-based Design for Optical phased array", Proceedings of SPIE, vol. 9757, 2016, 9 pages total, XP060069936.

Communication dated Dec. 1, 2021 issued by the European Patent Office in counterpart European Application No. 21184296.8.

* cited by examiner

PHASE MODULATOR AND PHASE MODULATOR ARRAY INCLUDING THE SAME

CROSS-REFERENCE TO RELATED APPLICATIONS

This application claims benefit to U.S. Patent Application No. 63/049,903, filed on Jul. 9, 2020, in the United States Patent and Trademark Office, and claims priority to Korean Patent Application No. 10-2021-0037549, filed on Mar. 23, 2021, in the Korean Intellectual Property Office, and Korean Patent Application No. 10-2021-0061637, filed on May 12, 2021, in the Korean Intellectual Property Office, the disclosures of which are incorporated by reference herein in their entireties.

BACKGROUND

1. Field

Example embodiments of the disclosure relate to a phase modulator and a phase modulator array.

2. Description of Related Art

Optical modulation devices that change the transmission/reflection/scattering characteristics, phase, amplitude, polarization, intensity, path, and the like of light are used in various optical devices. To control the properties of light in a desired way in an optical system, optical modulation devices having various structures have been proposed. For example, liquid crystal having optical anisotropy, a microelectromechanical system (MEMS) structure using micromechanical movements of light blocking/reflecting elements, and the like are used for general optical modulation devices. The optical modulation devices have a limitation in an operation response time due to the characteristics of a driving method. In the case of an MEMS structure, it is necessary to correct the nonlinearity of the characteristics of voltage-displacement, and an optimized driving voltage profile needs to be secured to compensate for an influence of vibrations of a motion system.

Recently, there have been attempts to utilize a meta structure using a surface plasmon or a gap surface plasmon for incident light in an optical modulation device.

SUMMARY

One or more example embodiments provide a phase modulator that stably maintains an over-coupling state, and a phase modulator array including the phase modulator.

One or more example embodiments also provide a phase modulator having improved light reflection properties, and a phase modulator array including the phase modulator.

One or more example embodiments also provide a phase modulator having a degree of freedom with respect to a distance between an antenna pattern and a phase change material pattern, and a phase modulator array including the phase modulator.

However, the objectives to be achieved are not limited to the above-described disclosure.

Additional aspects will be set forth in part in the description which follows and, in part, will be apparent from the description, or may be learned by practice of example embodiments of the disclosure.

According to an aspect of an example embodiment, there is provided a phase modulator including an antenna pattern, a lower reflective layer spaced apart from the antenna pattern in a vertical direction, a spacer provided between the antenna pattern and the lower reflective layer, and a phase shift pattern included in the spacer, the phase shift pattern including a phase shift material.

The phase shift pattern may be surrounded by the spacer.

A thickness in the vertical direction of a part of the spacer disposed between the phase shift pattern and the antenna pattern may be greater than a thickness in the vertical direction of another part of the spacer disposed between the phase shift pattern and the lower reflective layer.

The phase shift pattern may overlap the antenna pattern in the vertical direction.

The phase shift pattern may be disposed in an effective resonator area in the spacer configured to generate a gap plasmon.

A width of the antenna pattern in a horizontal direction perpendicular to the vertical direction may range from 50 nm to 2000 nm.

A width of the phase shift pattern in a horizontal direction perpendicular to the vertical direction may be the same as a width of the antenna pattern in the horizontal direction.

The phase modulator may further include a power source configured to apply a voltage to the antenna pattern, wherein the antenna pattern is configured to generate heat based on the voltage being applied to the antenna pattern.

The phase shift pattern may be spaced apart from the antenna pattern such that a difference between a highest temperature of the phase shift pattern and a lowest temperature of the phase shift pattern is minimal based on the heat being generated from the antenna pattern.

Based on the heat being generated from the antenna pattern, the phase shift pattern may be spaced apart from the antenna pattern such that a lowest temperature of the phase shift pattern is greater than or equal to 280° C.

The antenna pattern may include a plurality of antenna patterns disposed in a horizontal direction perpendicular the vertical direction, the phase shift pattern may include a plurality of phase shift patterns disposed between the plurality of antenna patterns and the lower reflective layer, the plurality of antenna patterns may have a same shape, and the plurality of phase shift patterns may be disposed in the horizontal direction.

The phase modulator may further include a power source configured to respectively apply a same voltage to the plurality of antenna patterns, wherein the plurality of antenna patterns are configured to generate heat based on the voltage being applied to the plurality of antenna patterns.

According to an aspect of an example embodiment, there is provided a phase modulator array including a first phase modulator, a second phase modulator spaced apart from the first phase modulator in a horizontal direction, a first power source configured to apply a voltage to the first phase modulator, and a second power source configured to apply a voltage to the second phase modulator, wherein each of the first phase modulator and the second phase modulator includes antenna patterns disposed in the horizontal direction, a lower reflective layer spaced apart from the antenna patterns in a vertical direction perpendicular to the horizontal direction, a spacer disposed between the antenna patterns and the lower reflective layer, and phase shift patterns included in the spacer and disposed in the horizontal direction, the phase shift patterns respectively including a phase shift material.

The first power source may be further configured to apply a first voltage to the antenna patterns included in the first phase modulator, the second power source is configured to apply a second voltage to the antenna patterns included in the second phase modulator, and the first voltage and the second voltage may be independent of each other.

A number of the phase shift patterns included in the first phase modulator may be the same as a number of the phase shift patterns included in the second phase modulator.

The spacer included in the first phase modulator and the spacer included in the second phase modulator may be different parts of one dielectric film.

The phase modulator array may further include a trench provided between the first phase modulator and the second phase modulator, wherein the trench exposes the lower reflective layer.

The phase modulator array may further include an insulation pattern provided in the trench, wherein a thermal conductivity of the insulation pattern is lower than a thermal conductivity of the spacer.

In each of the first phase modulator and the second phase modulator, the phase shift patterns may be surrounded by the spacer.

In each of the first phase modulator and the second phase modulator, a thickness in the vertical direction of a part of the spacer disposed between the phase shift patterns and the antenna patterns may be greater than a thickness in the vertical direction of another part of the spacer disposed between the phase shift patterns and the lower reflective layer.

According to an aspect of an example embodiment, there is provided a phase modulator including an antenna pattern, a lower reflective layer spaced apart from the antenna pattern in a vertical direction, a spacer provided between the antenna pattern and the lower reflective layer, the spacer including a dielectric material, and a phase shift pattern included in the spacer, the phase shift pattern including a phase shift material.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Figure 1:
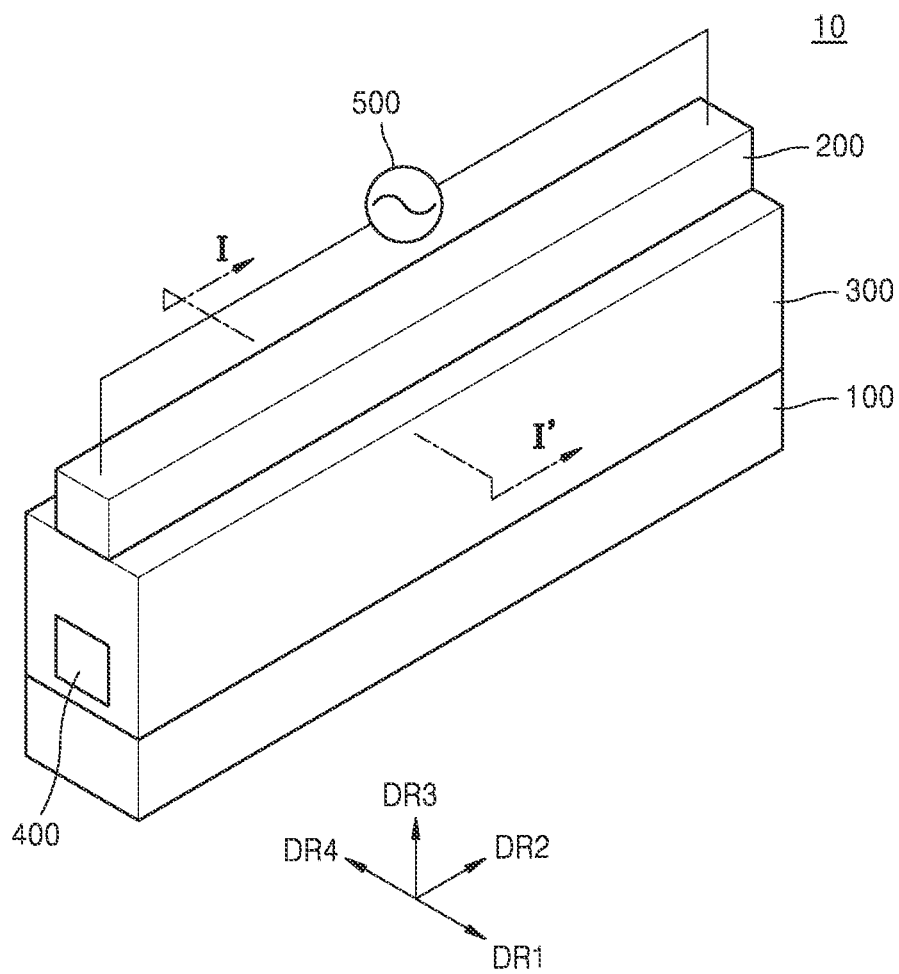
FIG. 1 is a perspective view of a phase modulator according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, the example embodiments of the disclosure are described in detail with reference to the accompanying drawings. Throughout the drawings, like reference numerals denote like elements. Sizes of components in the drawings may be exaggerated for convenience of explanation. In the above, although example embodiments have been described, these are merely exemplary, and those skilled in the art to which the present disclosure pertains could make various modifications and changes from these descriptions.

When a constituent element is disposed "above" or "on" to another constituent element, the constituent element may be only directly on the other constituent element or above the other constituent elements in a non-contact manner.

An expression used in a singular form in the specification also includes the expression in its plural form unless clearly specified otherwise in context. When a part may "include" a certain constituent element, unless specified otherwise, it may not be construed to exclude another constituent element but may be construed to further include other constituent elements.

Furthermore, terms such as "~portion," "~unit," "~module," and "~block" stated in the specification may signify a unit to process at least one function or operation.

Figure 2:
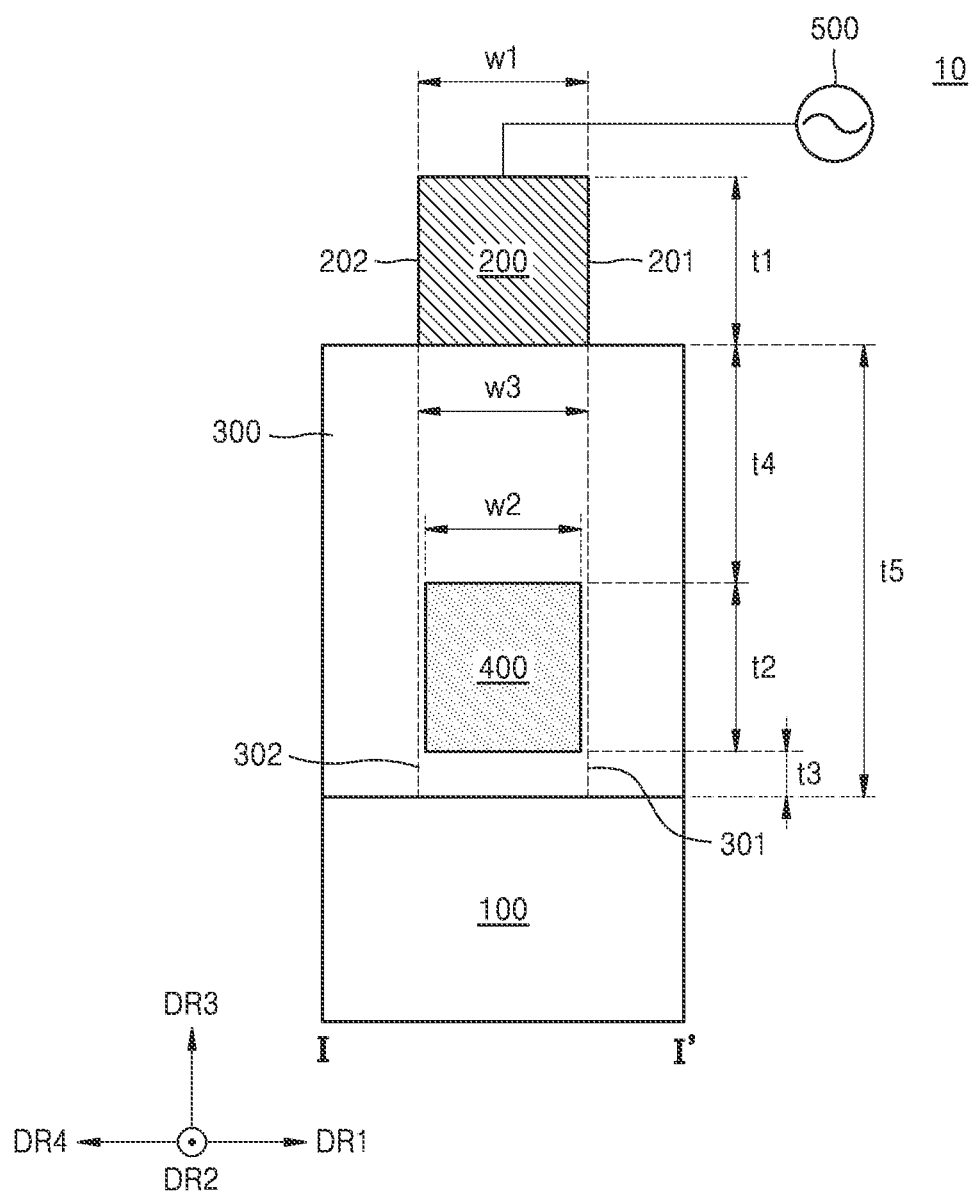
FIG. 2 is a cross-sectional view of the phase modulator taken along line I-I' of FIG. 1.
Figure 3A:
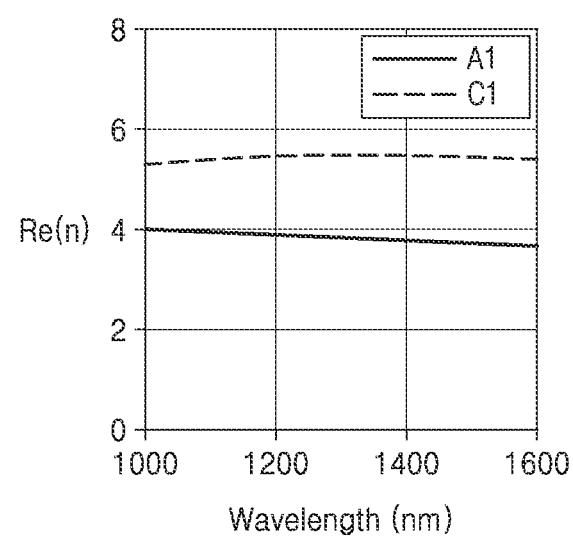
FIG. 3A is a graph of a real part of a refractive index of a phase change pattern of FIG. 1.
Figure 3B:
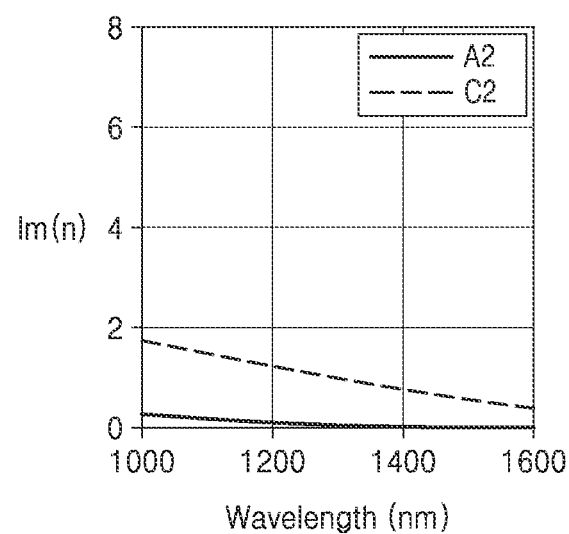
FIG. 3B is a graph of an imaginary part of the refractive index of the phase change pattern of FIG. 1.
Figure 4A:
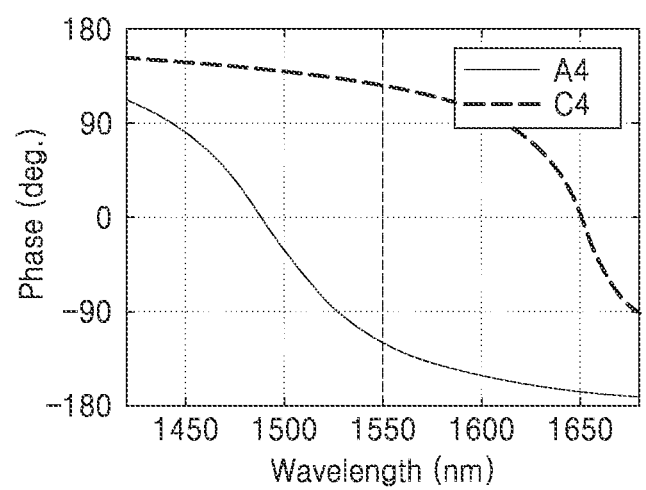
FIG. 4A is a graph of a reflection phase of the phase modulator according to an image of the phase change pattern of FIG. 1.
Figure 4B:
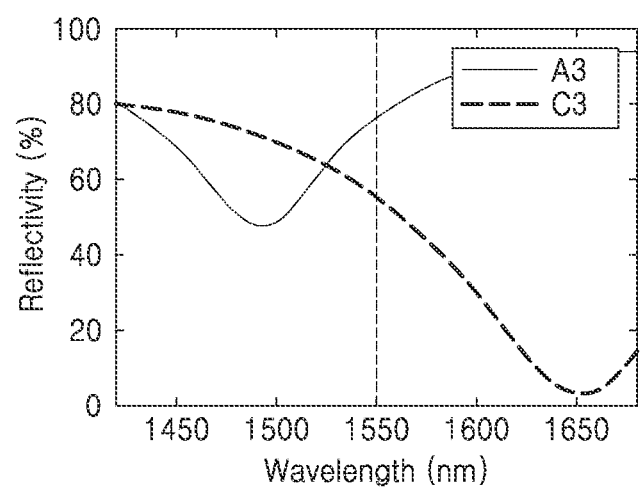
FIG. 4B is a graph of a reflectivity of the phase modulator according to the image of the phase change pattern of FIG. 1.
Figure 5:
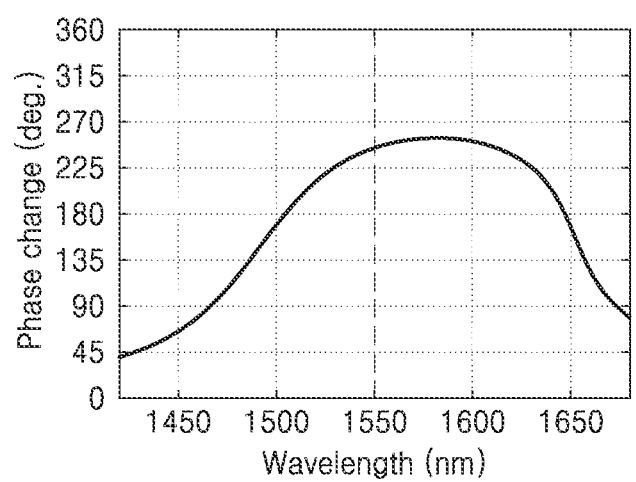
FIG. 5 is a graph of a modulation phase of the phase modulator of FIG. 1.

FIG. 1 is a perspective view of a phase modulator 10 according to an example embodiment. FIG. 2 is a cross-sectional view of the phase modulator 10 taken along line I-I' of FIG. 1. FIG. 3A is a graph of a real part of a refractive index of a phase change pattern of FIG. 1. FIG. 3B is a graph of an imaginary part of the refractive index of the phase change pattern of FIG. 1. FIG. 4A is a graph of a reflection phase of the phase modulator 10 according to an image of the phase change pattern of FIG. 1. FIG. 4B is a graph of a reflectivity of the phase modulator 10 according to the image of the phase change pattern of FIG. 1. FIG. 5 is a graph of a modulation phase of the phase modulator 10 of FIG. 1.

Referring to FIGS. 1 and 2, the phase modulator 10 may be provided. The phase modulator 10 may include a lower reflective layer 100, an antenna pattern 200, a spacer 300, a phase shift pattern 400, and a power element 500. The lower reflective layer 100 may extend in a first direction DR1, for example, a horizontal direction, and a second direction DR2 crossing each other. The lower reflective layer 100 may include an electrically conductive material. For example, the lower reflective layer 100 may include at least one metal selected from the group consisting of copper (Cu), aluminum (Al), nickel (Ni), iron (Fe), cobalt (Co), zinc (Zn), titanium (Ti), ruthenium (Ru), rhodium (Rh), palladium (Pd), platinum (Pt), osmium (Os), iridium (Ir), silver (Ag), gold (Au), and the like, and an alloy including at least one thereof. However, embodiments are not limited thereto. For example, the lower reflective layer 100 may include a thin film in which metal nanoparticles of Ag, Au, and the like are distributed, a carbon nanostructure of graphene or carbon nanotube (CNT), and the like, a conductive polymer such as poly(3,4-ethylenedioxythiophene) (PEDOT), polypyrrole (PPy), poly(3-hexylthiophene) (P3HT), and the like, a conductive oxide, and the like.

The antenna pattern 200 may be provided on the lower reflective layer 100. The antenna pattern 200 may be spaced apart a first distance t5 from the lower reflective layer 100 in a third direction DR3, for example, a vertical direction, perpendicular to the first direction DR1 and the second direction DR2 as illustrated in FIG. 2. For example, when the phase modulator 10 modulates a phase of near infrared having a wavelength of 1550 nanometers (nm), the first distance t5 may be 30 nm to 800 nm. The antenna pattern 200 may have a first width w1 and a first thickness t1. The first width w1 may be a size of the antenna pattern 200 in the first direction DR1. The first thickness t1 may be a size of the antenna pattern 200 in the third direction DR3. The first width w1 and the first thickness t1 may be less than a wavelength of an electromagnetic wave incident on the phase modulator 10. For example, the first width w1 and the first thickness t1 may be tens to hundreds of nanometers. In an example, the first width w1 with respect to an electromagnetic wave of a near infrared wavelength band may be 50 nm to 2000 nm. The antenna pattern 200 may have a first side surface 201 in the first direction DR1 and a second side surface 202 in a fourth direction DR4 opposite to the first direction DR1. The antenna pattern 200 may include a conductive material. For example, the antenna pattern 200 may include at least one metal selected from the group consisting of Cu, Al, Ni, Fe, Co, Zn, Ti, Ru, Rh, Pd, Pt, Os, Ir, Ag, Au, and the like, and an alloy including at least one thereof. However, embodiments are not limited thereto. For example, the antenna pattern 200 may include a thin film in which metal nanoparticles of Ag, Au, and the like are distributed, a carbon nanostructure of graphene or CNT, and the like, a conductive polymer such as PEDOT, PPy, P3HT, and the like, a conductive oxide, and the like. In an example, the antenna pattern 200 may include the same material as the lower reflective layer 100.

The spacer 300 may be provided between the lower reflective layer 100 and the antenna pattern 200. The spacer 300 may include a dielectric material. For example, the spacer 300 may include a dielectric silicon compound, for example, a silicon oxide ($SiO_x$), a silicon nitride ($Si_xN_y$), or a silicon oxynitride (SiON), or a dielectric metal compound, for example, an aluminum oxide ($Al_2O_3$), a hafnium oxide (HfO), a zirconium oxide (ZrO), or a hafnium silicon oxide (HfSiO).

A first reflection boundary 301 and a second reflection boundary 302 in the spacer 300 may be determined by the antenna pattern 200. The first reflection boundary 301 may be a boundary from which a gap plasmon traveling in the spacer 300 in the first direction DR1 is reflected in the fourth direction DR4. The gap plasmon is described below. The second reflection boundary 302 may be a boundary from which a gap plasmon traveling in the spacer 300 in the fourth direction DR4 is reflected in the first direction DR1. The first reflection boundary 301 and the second reflection boundary 302 may be respectively aligned with the first side surface 201 and the second side surface 202 of the antenna pattern 200. An area between the first reflection boundary 301 and the second reflection boundary 302 may be referred to as an effective resonator area. The first reflection boundary 301 and the second reflection boundary 302 may be spaced apart by a second distance w3 from each other in the first direction DR1. The second distance w3 may be referred to as an effective resonator length. The second distance w3 may be substantially the same as the first width w1.

The lower reflective layer 100, the spacer 300, and the antenna pattern 200 may form a gap plasmon resonator having a metal-dielectric-metal (MIM) structure. A gap plasmon is a coupling of a photon and an electron resonating in a dielectric of a MIM structure. A resonance condition of a gap plasmon resonator including the lower reflective layer 100, the antenna pattern 200, and the spacer 300 to generate a gap plasmon is shown in Equation 1 below.

$$\frac{2\pi}{\lambda_0} \cdot 2l \cdot n_{\mathit{eff}} + 2\varphi_{\mathit{ref}} = 2\pi \cdot m \quad \text{[Equation 1]}$$

Here, $\lambda_0$ is a wavelength of an incident electromagnetic wave, l is a width (w1) of the antenna pattern 200, $n_{\mathit{eff}}$ is an effective refractive index of a gap plasmon, $\varphi\varphi_{\mathit{ref}}$ is a reflection phase of a gap plasmon when reflected from the first reflection boundary 301 and the second reflection boundary 302, and m is a resonance order.

The phase shift pattern 400 may be provided in the spacer 300. The phase shift pattern 400 may be inserted into the spacer 300. The phase shift pattern 400 may be surrounded by the spacer 300. For example, the spacer 300 may be provided on an upper surface, a lower surface, and both side surfaces of the phase shift pattern 400. The phase shift pattern 400 may overlap the antenna pattern 200 in the third direction DR3. The phase shift pattern 400 may be spaced apart by a third distance t3 from the lower reflective layer 100 in the third direction DR3. The phase shift pattern 400 and the antenna pattern 200 may be spaced apart by a fourth distance t4 from each other in the third direction DR3 a fourth distance t4. The fourth distance t4 may be greater than the third distance t3. The phase shift pattern 400 may be located between the first reflection boundary 301 and the second reflection boundary 302. The phase shift pattern 400 may have a second width w2 and a second thickness t2. The second width w2 may be a size of the phase shift pattern 400 in the first direction DR1. The second thickness t2 may be a size of the phase shift pattern 400 in the third direction DR3. Although the second width w2 is illustrated to be less than the first width w1, embodiments are not limited thereto. In another example, the second width w2 may be equal to or greater than the first width w1. The phase shift pattern 400 may include a phase shift material. For example, the phase shift pattern 400 may include germanium antimony telluride (GeSbTe) or vanadium oxide ($VO_2$).

The power element 500 may be a power source that is electrically connected to the antenna pattern 200. The power element 500 may apply an AC voltage to both end portions of the antenna pattern 200. For example, both end portions of the antenna pattern 200 may be spaced apart from each other in the second direction DR2. When the power element 500 applies an AC voltage to the antenna pattern 200, heat may be generated from the antenna pattern 200. The heat generated from the antenna pattern 200 may reach the phase shift pattern 400 and change a temperature of the phase shift pattern 400. Accordingly, the power element 500 may adjust the temperature of the phase shift pattern 400.

When the antenna pattern 200 generates heat, the temperature of the phase shift pattern 400 may be accordingly changed differently for each part of the phase shift pattern 400. For example, the temperature of a part of the phase shift pattern 400 relatively close to the antenna pattern 200 may rise relatively quickly, and the temperature of other part of the phase shift pattern 400 relatively far from the antenna pattern 200 may rise relatively slowly. The fourth distance t4 may be determined such that a difference between the highest temperature and the lowest temperature of the phase shift pattern 400 when heat is generated from the antenna pattern 200 is the lowest, thereby optimizing the phase modulator 10. For example, the lowest temperature of the phase shift pattern 400 may be about 280° C. or more. During the manufacturing of the phase modulator 10, as the fourth distance t4 is adjustable by using the spacer 300, there is a degree of freedom with respect to the fourth distance t4, and the phase modulator 10 may be optimized.

Referring to FIGS. 3A and 3B, the phase shift pattern 400 may have a refractive index that is determined according to a phase. FIG. 3A illustrates a real part of a refractive index according to the phase of the phase shift pattern 400, and FIG. 3B illustrates an imaginary part of the refractive index according to the phase of the phase shift pattern 400. The phase of the phase shift pattern 400 may be determined according to the temperature of the phase shift pattern 400. For example, the phase shift pattern 400 may have an amorphous phase, a crystalline phase, and a medium phase according to the temperature of the phase shift pattern 400. A real part and an imaginary part of a refractive index of the phase shift pattern 400 having a medium phase may have values between real parts and imaginary parts of refractive indexes of the phase shift pattern 400 having an amorphous phase and the phase shift pattern 400 having a crystalline phase. In FIG. 3A, a graph C1 indicates a real part of a refractive index when the phase shift pattern 400 has a crystalline phase, and a graph A1 indicate a real part of a refractive index when the phase shift pattern 400 has an amorphous phase. In FIG. 3B, a graph C2 indicates an imaginary part of a refractive index when the phase shift pattern 400 has a crystalline phase, and a graph A2 indicates an imaginary part of a refractive index when the phase shift pattern 400 has an amorphous phase.

A real part of a refractive index difference according to the phase of the phase shift pattern 400 may be related to a degree of movement of a reflection phase spectrum of the phase modulator 10 along a wavelength axis. As the difference in the real part of a refractive index increases, a reflection phase spectrum of a phase modulator may significantly move along a wavelength axis. For example, as illustrated in FIG. 3A, when the phase shift pattern 400 includes GST ($Ge_xSb_yTe_z$), a difference of the real part of a refractive index in a near infrared wavelength band (about 1550 nm band) may be 0.5 to 3.

Referring to FIG. 4A, a reflection phase spectrum C4 when the phase shift pattern 400 has a crystalline phase may be a reflection phase spectrum that is moved along a wavelength axis from a reflection phase spectrum A4 when the phase shift pattern 400 has an amorphous phase. Referring to FIG. 5, the phase modulator 10 according to example embodiments may modulate a phase in a near infrared wavelength band in a range of about 260° C. According to example embodiments, the phase modulator 10 may have a large phase modulation width.

An amount of an imaginary part of a refractive index according to the phase of the phase shift pattern 400 may be related to a light absorption rate of the phase shift pattern 400. As the imaginary part of a refractive index decreases, the light absorption rate of the phase shift pattern 400 may decrease as well. For example, as illustrated in FIG. 3B, in an amorphous phase, the imaginary part A2 of a refractive index of the phase shift pattern 400 is about 0.1, and in a crystalline phase, the imaginary part C2 of a refractive index of the phase shift pattern 400 is about 0.5 to 2, which are both relatively small values.

The phase shift pattern 400 according to example embodiments may be surrounded by the spacer 300. As the spacer 300 includes a dielectric material, an imaginary part of an effective refractive index of a gap plasmon may be less than an imaginary part of a refractive index of the phase shift pattern 400. Accordingly, an imaginary part of an effective refractive index of a gap plasmon between the lower reflective layer 100 and the antenna pattern 200 may have a relatively small value. Referring to FIG. 4B, the phase modulator 10 of the disclosure may have a high reflectivity of 40% or more in a near infrared wavelength band. In FIG. 4B, a graph C3 indicates a reflectivity when the phase shift pattern 400 has a crystalline phase, and a graph A3 indicates a reflectivity when the phase shift pattern 400 has an amorphous phase. The phase modulator 10 according to example embodiments may have a low light absorption rate.

Figure 6:
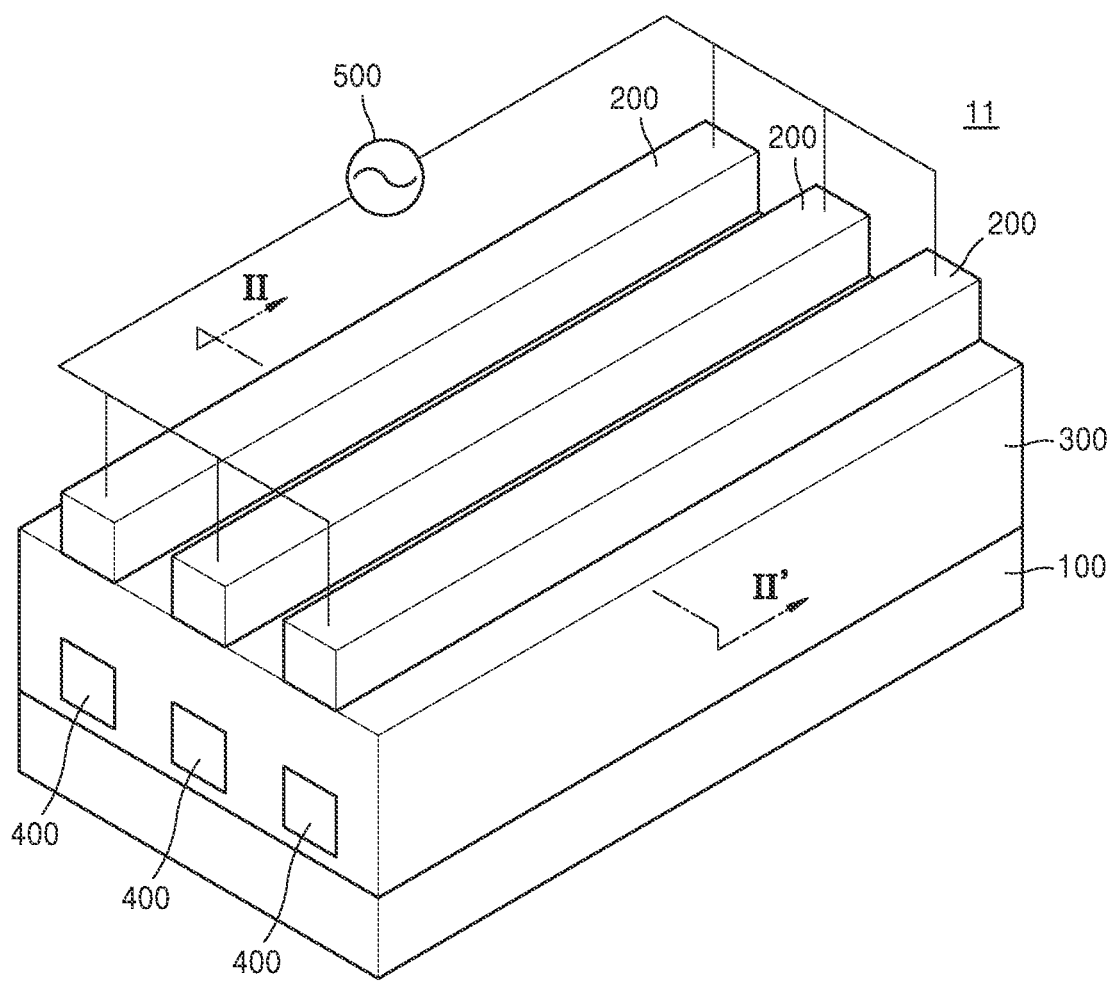
FIG. 6 is a perspective view of a phase modulator according to an example embodiment.
Figure 6:
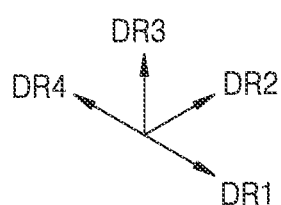
Figure 7:
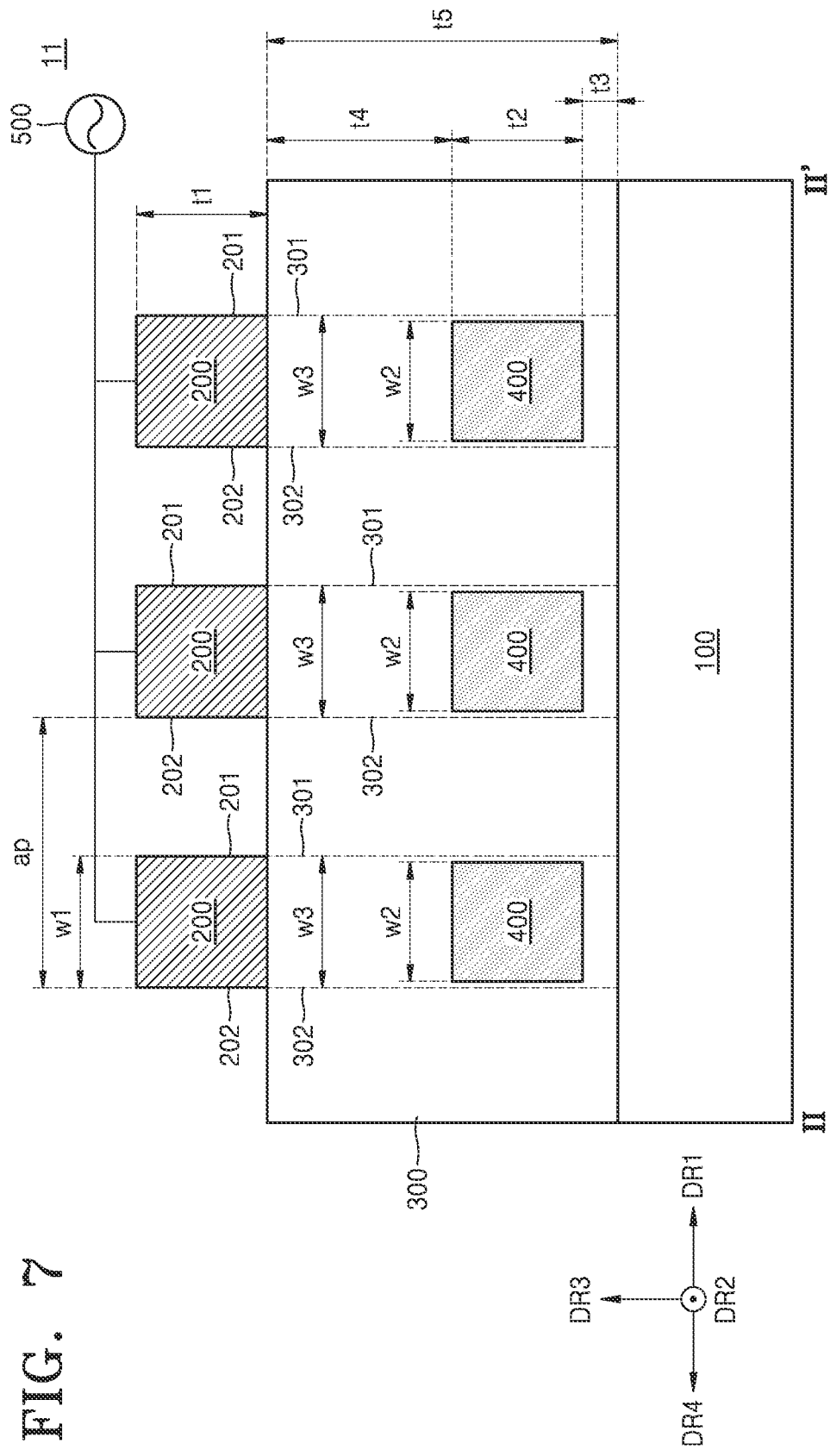
FIG. 7 is a cross-sectional view of the phase modulator taken along line II-II' of FIG. 6.

Photons and electrons in the phase modulator 10 may have an over-coupling state. In this case, a reflection phase spectrum of the phase modulator 10 may be gradually changed within a range of about 360° C. When the photons and the electrons have an under-coupling state, not the over-coupling, a maximum phase difference may be about 180°. As the light absorption rate of the phase modulator 10 decreases, the over-coupling state of photons and electrons may be stably maintained in the phase modulator 10. According to example embodiments, as the phase shift pattern 400 having a small imaginary part of a refractive index and the spacer 300 surrounding the phase shift pattern 400 may be used, and the light absorption rate of the phase modulator 10 may be reduced. Accordingly, the photons and electrons in the phase modulator 10 may stably have an over-coupling state. FIG. 6 is a perspective view of a phase modulator 11 according to an example embodiment. FIG. 7 is a cross-sectional view of the phase modulator 11 taken along line II-II' of FIG. 6. For brevity of explanation, descriptions that are substantially the same as those presented with reference to FIGS. 1 and 2 may not be provided.

Referring to FIGS. 6 and 7, the phase modulator 11 may be provided. The phase modulator 11 may include the lower reflective layer 100, antenna patterns 200, the spacer 300, phase shift patterns 400, and the power element 500. The lower reflective layer 100, the spacer 300, and the power element 500 may be may be substantially the same as those described with reference to FIGS. 1 and 2.

The antenna patterns 200 may be provided on the spacer 300. Each of the antenna patterns 200 may be substantially the same as the antenna pattern 200 described with reference to FIGS. 1 and 2. The antenna patterns 200 may be arranged in the first direction DR1. For example, an arrangement period ap of the antenna patterns 200 may be 100 nm to 4000 nm. The antenna patterns 200 may have substantially the same shape and size. Accordingly, surface plasmon resonators respectively including the antenna patterns 200 may form a gap plasmon by receiving an electromagnetic wave having substantially the same wavelength. The power element 500 may be electrically connected to the antenna patterns 200. The power element 500 may apply substantially the same AC voltages to each of the antenna patterns 200. Accordingly, the antenna patterns 200 may generate heat of substantially the same level.

The phase shift patterns 400 may be provided in the spacer 300. Each of the phase shift patterns 400 may be substantially the same as the phase shift pattern 400 described with reference to FIGS. 1 and 2. The phase shift patterns 400 may be arranged in the first direction DR1. For example, a distance between the phase shift patterns 400 may be 20 nm to 2000 nm. The phase shift patterns 400 may respectively overlap the antenna patterns 200 in the third direction DR3. The third and fourth distances t3 and t4 of the phase shift patterns 400 may be substantially the same as those in FIG. 2. As the antenna patterns 200 generate heat of substantially the same level and the fourth distances t4 is the same, a change in temperature of the phase shift patterns 400 may be substantially the same.

Figure 8:
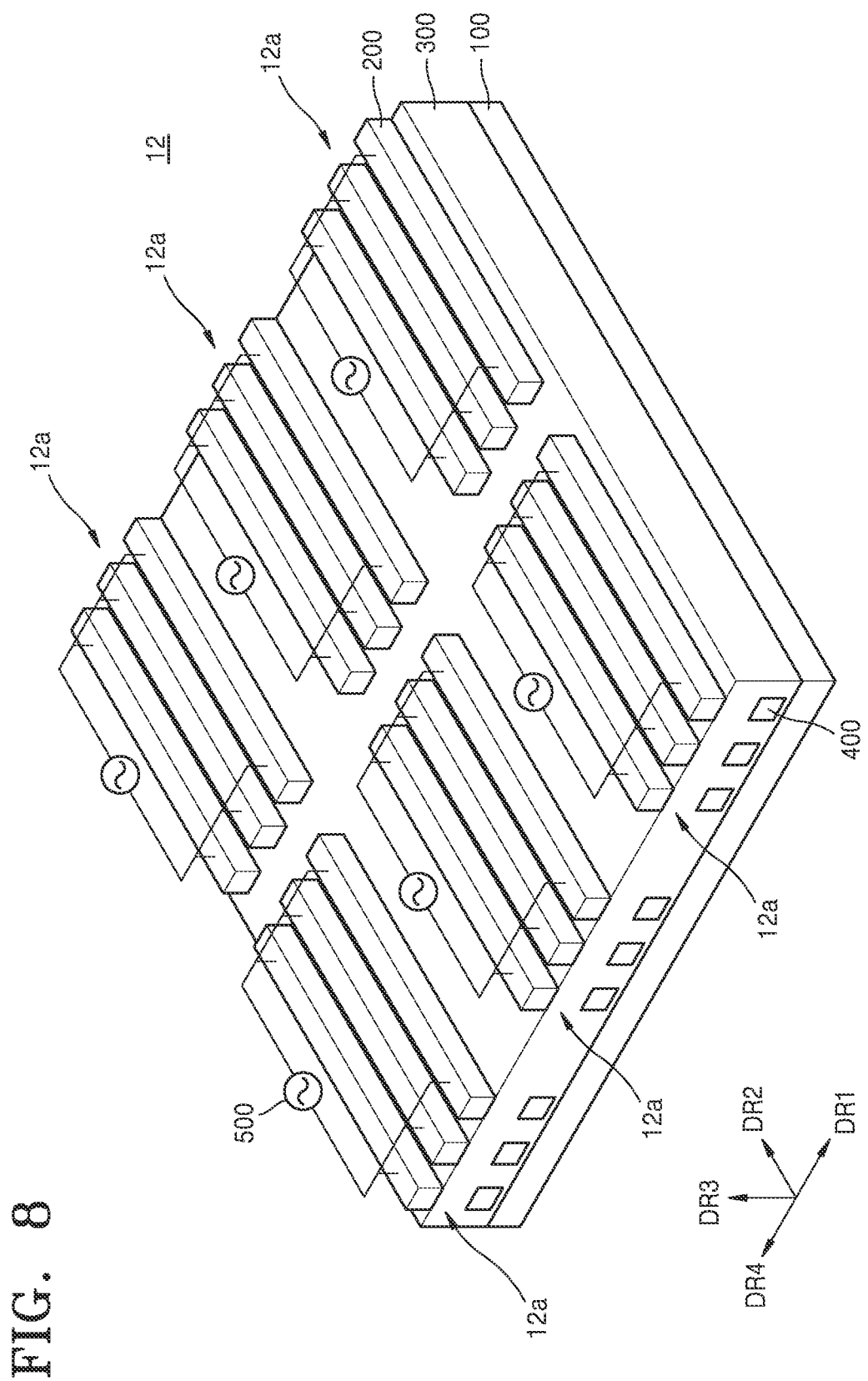
FIG. 8 is a perspective view of a phase modulator array according to an example embodiment.

FIG. 8 is a perspective view of a phase modulator array 12 according to an example embodiment. For brevity of explanation, descriptions that are substantially the same as those presented with reference to FIGS. 6 and 7 may not be provided.

Referring to FIG. 8, the phase modulator array 12 may be provided. The phase modulator array 12 may include a plurality of phase modulators 12a arranged in two dimensions. For example, the phase modulator array 12 may include the phase modulators 12a arranged in the first direction DR1 and the phase modulators 12a arranged the second direction DR2 respectively therefrom. Each of the phase modulators 12a may be substantially the same as the phase modulator 11 described with reference to FIGS. 6 and 7. The lower reflective layers 100 of the phase modulators 12a may be respectively connected to the spacers 300. For example, the lower reflective layers 100 may be different parts of that lower reflective layer 100 that is integrally formed, and the spacers 300 may be different parts of the spacer 300 that is integrally formed. The phase modulators 12a may respectively include the power elements 500. In each of the phase modulators 12a, the power element 500 may apply substantially the same AC voltages to the antenna patterns 200. The power elements 500 may apply AC voltages that are independent of each other. For example, the power element 500 included in one phase modulator 12a may apply a first AC voltage to the antenna patterns 200 included in another phase modulator 12a, and the power element 500 included in the another phase modulator 12a may apply a second AC voltage that is the same as or different from the first AC voltage, to the antenna patterns 200 included in the another phase modulator 12a. The phase modulators 12a may have light modulation properties that are independent of each other.

The phase modulator array 12 is not limited to one including the phase modulators 12a arranged in two dimensions. In another example, the phase modulator array 12 may include the phase modulators 12a that are arranged in one dimension, for example, in the first direction DR1 or the second direction DR2.

Figure 9:
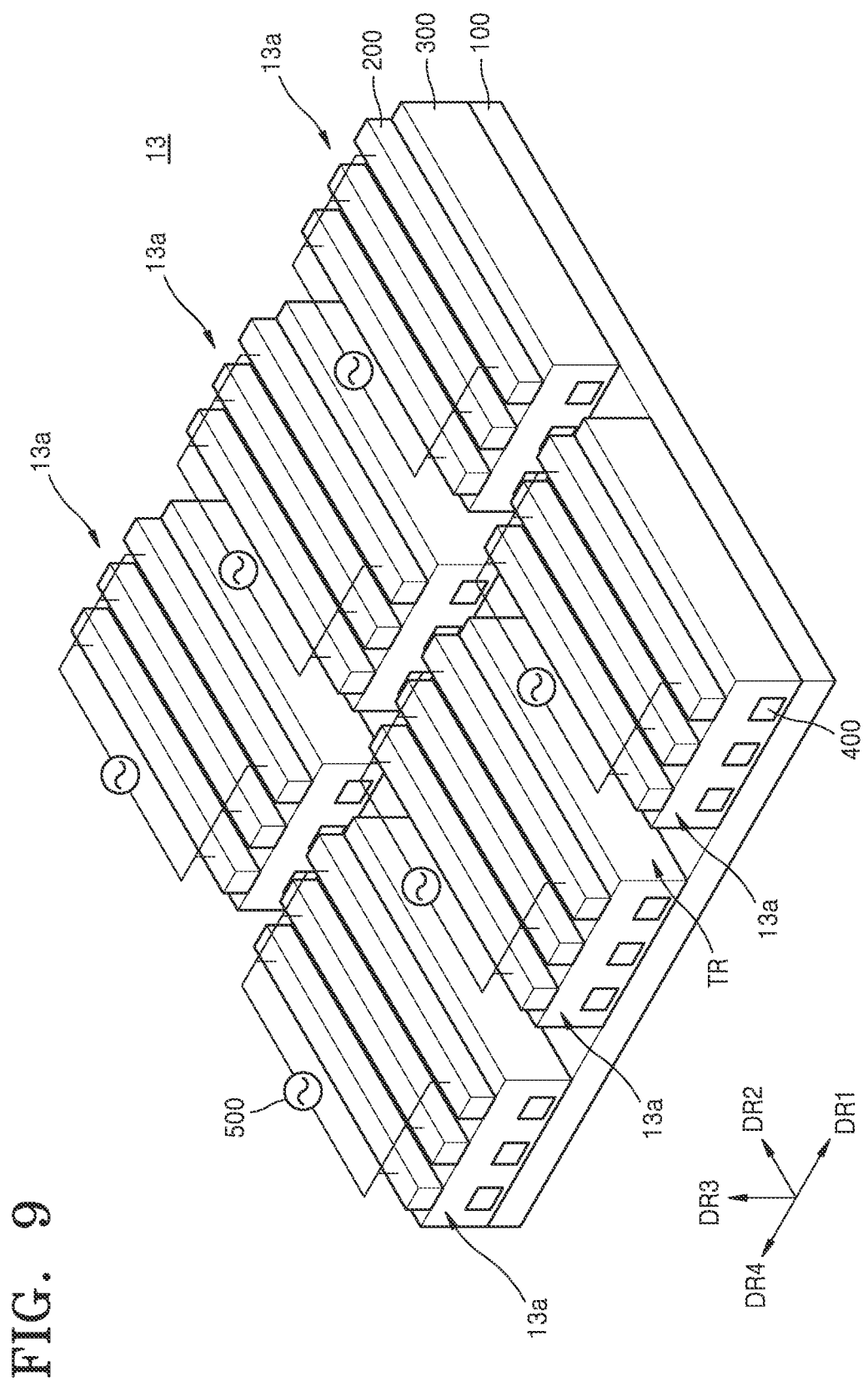
FIG. 9 is a perspective view of a phase modulator array according to an embodiment.

FIG. 9 is a perspective view of a phase modulator array 13 according to an example embodiment. For brevity of explanation, descriptions that are substantially the same as those presented with reference to FIG. 8 may not be provided.

Referring to FIG. 9, the phase modulator array 13 may be provided. The phase modulator array 13 may include a plurality of phase modulators 13a arranged in two dimensions. Unlike the description presented with reference to FIG. 8, the trenches TR may be provided between the spacers 300 of each of the phase modulators 13a. The trenches TR may separate the spacers 300 from each other. The trenches TR may extend in the first direction DR1 and in the second direction DR2 between the spacers 300. The trenches TR may be connected to each other. The trenches TR may expose an upper surface of the lower reflective layer 100. The trenches TR may be filled with air. As air has a thermal conductivity lower than the spacers 300, the phase modulators 13a neighboring and provided adjacent to each other may be thermally separated from each other. For example, an effect of the heat generated from the antenna patterns 200 in one phase modulator 13a on the phase shift patterns 400 in another phase modulator 13a neighboring the one phase modulator 13a may be reduced or prevented.

The phase modulator array 13 is not limited to including the phase modulators 13a arranged in two dimensions. In another example, the phase modulator array 13 may include the phase modulators 13a arranged in one dimension, for example, in the first direction DR1 or the second direction DR2.

Figure 10:
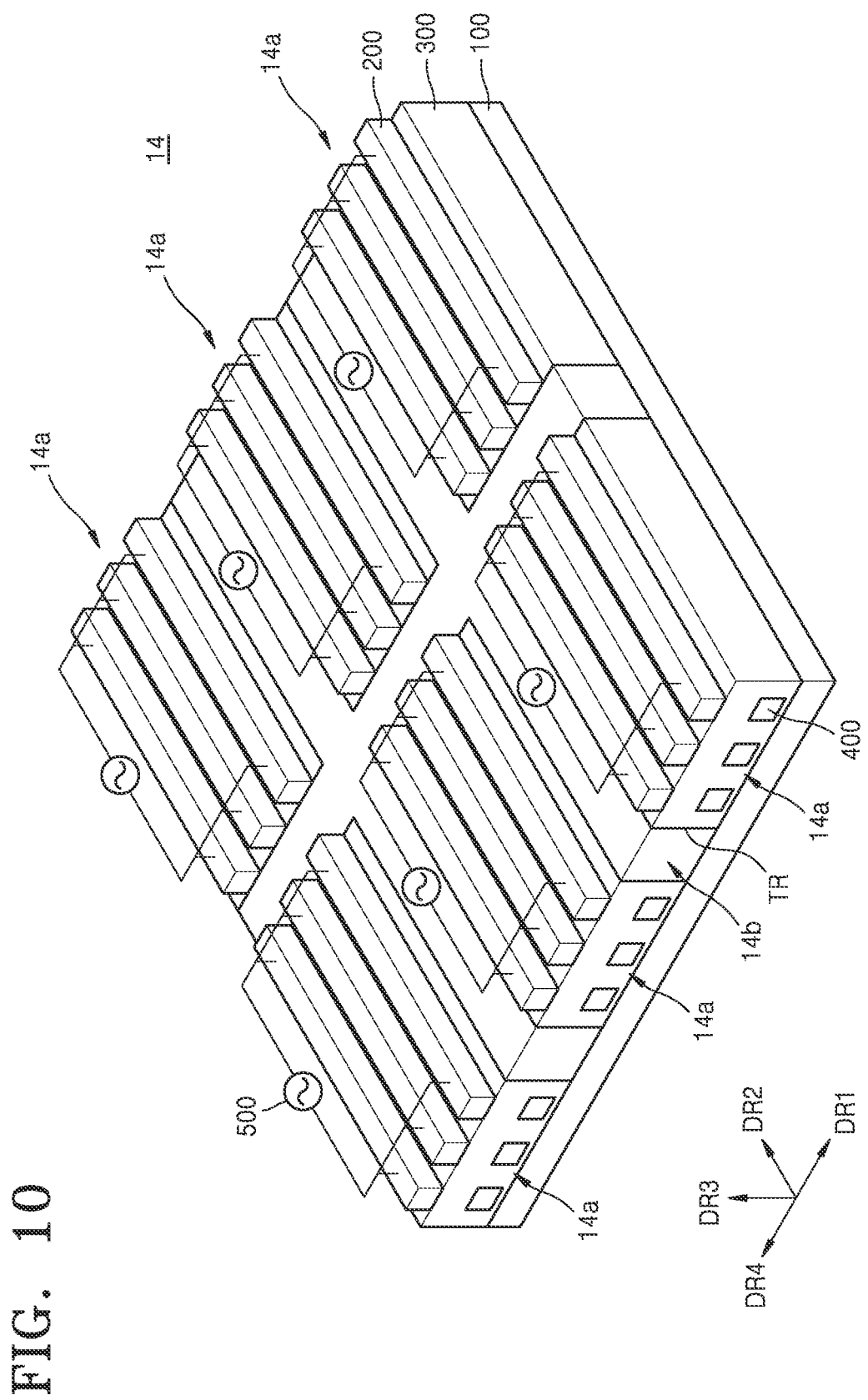
FIG. 10 is a perspective view of a phase modulator array according to an example embodiment.

FIG. 10 is a perspective view of a phase modulator array 14 according to an embodiment. For brevity of explanation, descriptions that are substantially the same as those presented with reference to FIG. 9 may not be provided.

Referring to FIG. 10, the phase modulator array 14 may be provided. The phase modulator array 14 may include a plurality of phase modulators 14a arranged in two dimensions. Unlike the description presented with reference to FIG. 9, a plurality of insulation patterns 14b may be provided in the trenches TR. For example, the insulation patterns 14b may fill the trenches TR. The insulation patterns 14b may extend in the first direction DR1 and the second direction DR2 and may be connected to each other. The insulation patterns 14b may include a dielectric material having a low thermal conductivity than the spacers 300. For example, when the spacers 300 includes $Al_2O_3$, the insulation patterns 14b may include amorphous $SiO_2$ having a lower thermal conductivity than $Al_2O_3$. Accordingly, the phase modulators 14a neighboring and provided adjacent to each other may be thermally separated from each other. For example, an effect of the heat generated from the antenna patterns 200 in one phase modulator 14a on the phase shift patterns 400 in another phase modulator 14a neighboring the one phase modulator 14a may be reduced or prevented.

The phase modulator array 14 is not limited to including the phase modulators 14a arranged in two dimensions. In another example, the phase modulator array 14 may include the phase modulators 14a arranged in one dimension, for example, in the first direction DR1 or the second direction DR2.

Figure 11:
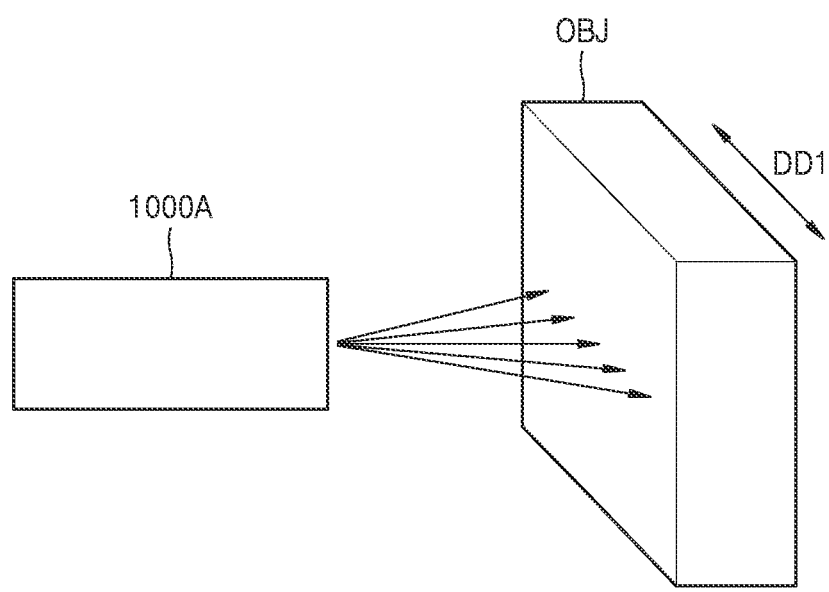
FIG. 11 is a conceptual view of a beam steering device according to an example embodiment.

FIG. 11 is a conceptual view of a beam steering device 1000A according to an example embodiment.

Referring to FIG. 11, the beam steering device 1000A may be provided. The beam steering device 1000A may include a non-mechanical beam scanning apparatus. The beam steering device 1000A may steer a beam in a one-dimensional direction. The beam steering device 1000A may steer a beam toward an object OBJ in a first adjustment direction DD1. The beam steering device 1000A may include one of the phase modulator arrays 12, 13, and 14 described with reference to FIGS. 8, 9, and 10.

Figure 12:
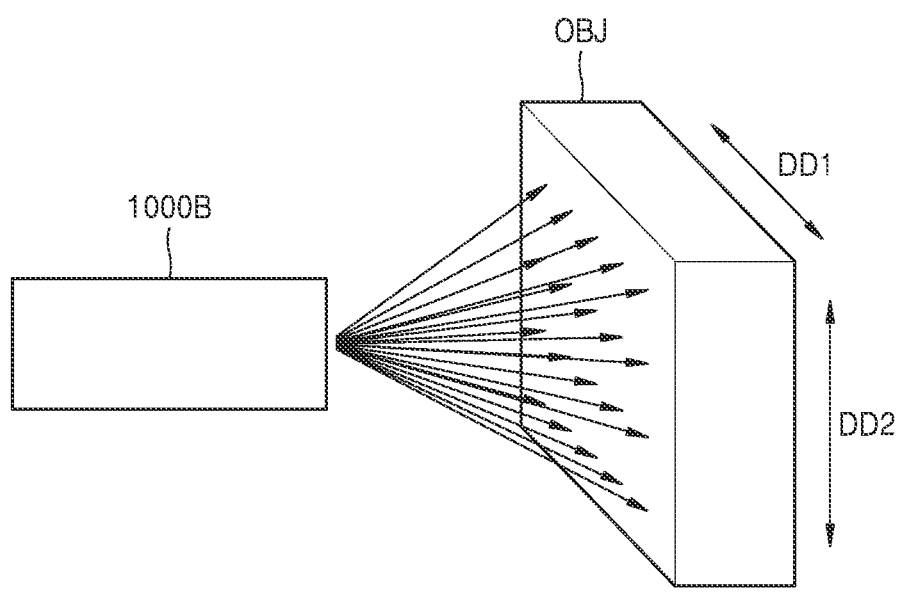
FIG. 12 is a conceptual view of a beam steering device according to an example embodiment.

FIG. 12 is a conceptual view of a beam steering device 1000B according to an example embodiment.

Referring to FIG. 12, the beam steering device 1000B may be provided. The beam steering device 1000B may include a non-mechanical beam scanning apparatus. The beam steering device 1000B may steer a beam in a two-dimensional direction. For example, the beam steering device 1000B may steer a beam toward the object OBJ in the first adjustment direction DD1 and a second adjustment direction DD2 crossing the first adjustment direction DD1. The beam steering device 1000A may include one of the phase modulator arrays 12, 13, and 14 described with reference to FIGS. 8, 9, and 10.

Figure 13:
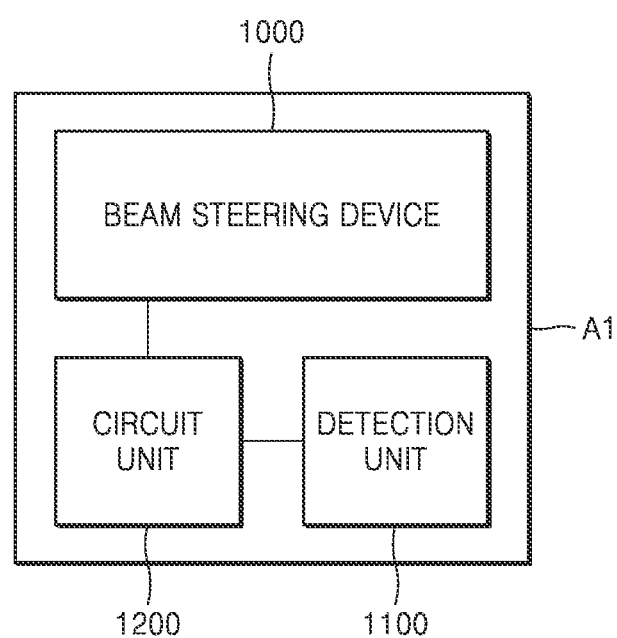
FIG. 13 is a block diagram of an electronic device according to an example embodiment.

FIG. 13 is a block diagram of an electronic device A1 according to an example embodiment.

Referring to FIG. 13, the electronic device A1 may be provided. The electronic device A1 may include a beam steering device 1000. The beam steering device 1000 may be substantially the same as the beam steering devices 1000A and 1000B of FIGS. 13 and 14. The electronic device A1 may include a light source in the beam steering device 1000, or a light source provided separately from the beam steering device 1000.

The electronic device A1 may include a detection unit 1100 for detecting light that is steered by the beam steering device 1000 and reflected by an object. The detection unit 1100 may include a plurality of light detection elements and further include optical members. Furthermore, the electronic device A1 may further include a circuit unit 1200 connected to at least one of the beam steering device 1000 or the detection unit 1100. The circuit unit 1200 may include an operation unit for obtaining and operating data, and further include a driving unit, a control unit, and the like. Furthermore, the circuit unit 1200 may further include a power unit, a memory, and the like Although FIG. 13 illustrates an example in which the electronic device A1 includes the beam steering device 1000 and the detection unit 1100 in one device, the beam steering device 1000 and the detection unit 1100 may be provided in separate devices. Furthermore, the circuit unit 1200 may be connected to the beam steering device 1000 or the detection unit 1100 in a wireless communication method, not in a wired manner. In addition, the configuration of the electronic device A1 of FIG. 13 may be changed in various ways.

The beam steering device 1000 according to the above-described example embodiment may be applied to various electronic devices. In an example, the beam steering device 1000 may be applied to a light detection and ranging (LiDAR) device. The LiDAR device may include a phase-shift type device or a time-of-flight (TOF) type device. Furthermore, a phase modulator according to an example embodiment, or a beam steering device including the phase modulator may be mounted on electronic devices such as smartphones, wearable devices (augmented reality (AR) and virtual reality (VR) implementing glasses-type devices, and the like), Internet of Things (IoT) devices, home appliances, tablet personal computers (PCs), personal digital assistants (PDAs), portable multimedia players (PMPs), navigations, drones, robots, driverless cars, autonomous driving cars, advanced drivers assistance systems (ADASs), and the like.

Figure 14:
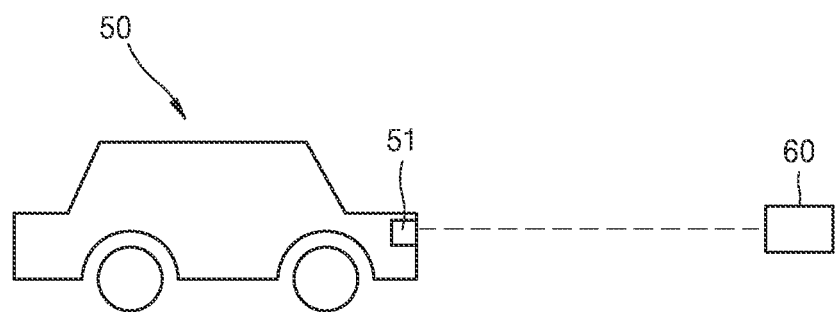
FIGS. 14 and 15 are conceptual views showing a case in which a light detection and ranging (LiDAR) device according to an example embodiment is applied to a vehicle.
Figure 15:
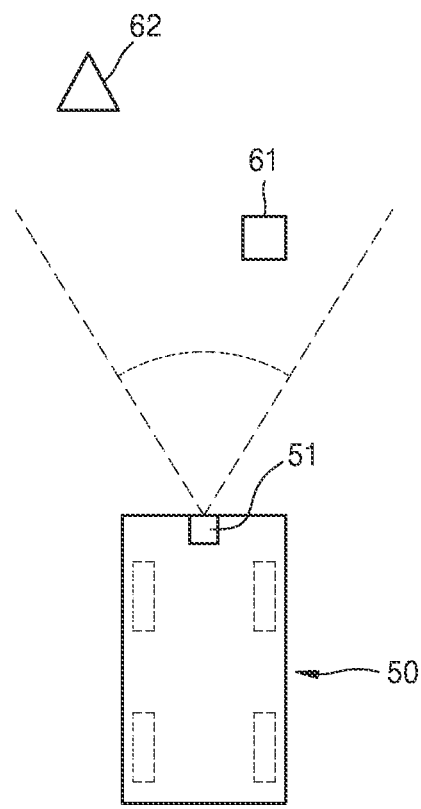

FIGS. 14 and 15 are conceptual views showing a case in which a LiDAR device 51 according to an example embodiment is applied to a vehicle 50.

Referring to FIGS. 14 and 15, the LiDAR device 51 may be applied to the vehicle 50, and information about an object 60 may be obtained by using the LiDAR device 51. The vehicle 50 may be a vehicle having an autonomous driving function. The LiDAR device 51 may detect objects or humans, that is, the object 60, present in a direction in which the vehicle 50 drives. The LiDAR device 51 may measure a distance from the object 60 by using information such as a time difference between a transmitting signal and a detection signal, and the like. As illustrated in FIG. 15, the LiDAR device 51 may obtain information about an object 61 closely located within a scanning range and an object 62 located farther than the object 61.

Figure 16:
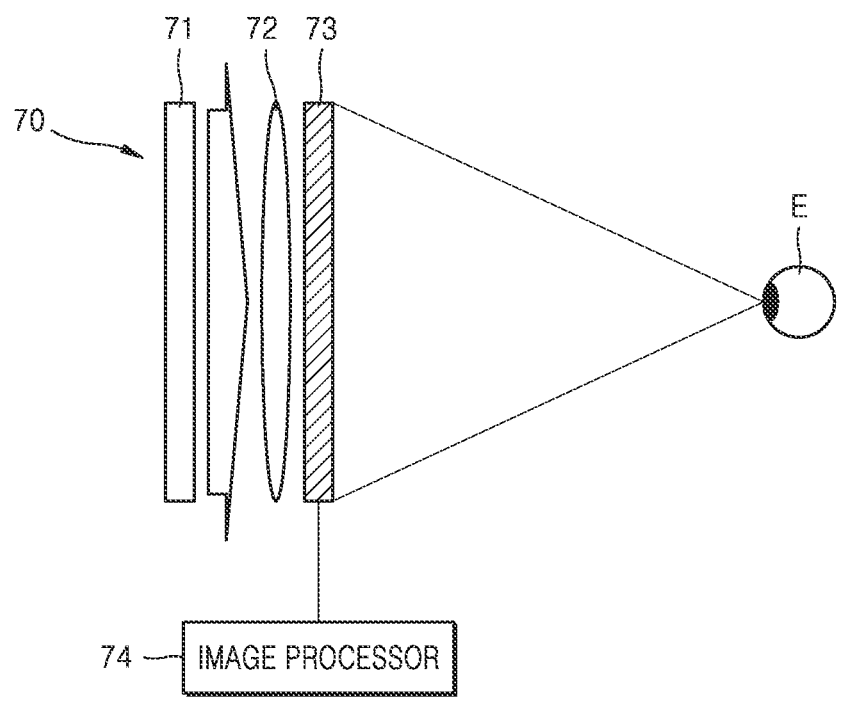
FIG. 16 is a conceptual view of a holographic display device according to an example embodiment.

FIG. 16 is a conceptual view of a holographic display device 70 according to an example embodiment.

Referring to FIG. 16, the holographic display device 70 may be provided. The holographic display device 70 may include a backlight unit 71, a Fourier lens 72, a phase modulation device 73, and an image processor 74. The phase modulation device 73 may include a plurality of pixels arranged in two dimensions. The phase modulation device 73 may include any one of the phase modulation arrays 12, 13, and 14 of FIGS. 8 to 10. In an example, the phase modulators 12a, 13a, and 14a respectively included in the phase modulation arrays 12, 13, and 14 may correspond to the respective pixels of the phase modulation device 73. In another example, the phase modulators 12a, 13a, and 14a included in the phase modulation arrays 12, 13, and 14 may be classified into a plurality of phase modulator groups, and the phase modulator groups may correspond to the pixels of the phase modulation device 73. Each of the phase modulator groups may include phase modulators adjacent to each other.

The image processor 74 may be connected to the phase modulation device 73 in a wired or wireless manner. The phase modulation device 73 may receive a hologram data signal from the image processor 74. The phase modulation device 73 may control the phase of light according to the hologram data signal from the image processor 74.

The backlight unit 71 may emit coherent light. For example, the backlight unit 71 may include a laser diode to provide light having high coherence. The backlight unit 71 may include, in addition to a laser diode, any light source capable of emitting light having spatial coherence. Furthermore, the backlight unit 71 may further include an optical system that magnifies light emitted from a laser diode and produces a collimated parallel light having a uniform intensity distribution. Accordingly, the backlight unit 71 may provide parallel coherence light having a spatially uniform intensity distribution to the entire area of the phase modulation device 73.

The Fourier lens 72 may focus a holographic image or an image in space. For example, a holographic image may be reproduced on a focal plane of the Fourier lens 72, and the eye E of a user may be arranged on the focal plane to see the holographic image. Although the Fourier lens 72 is located on an incident light surface of the phase modulation device 73, that is, between the backlight unit 71 and the phase modulation device 73, the location of the Fourier lens 72 is not limited thereto. For example, the Fourier lens 72 may be located on a light exit surface of the phase modulation device 73.

Figure 17:
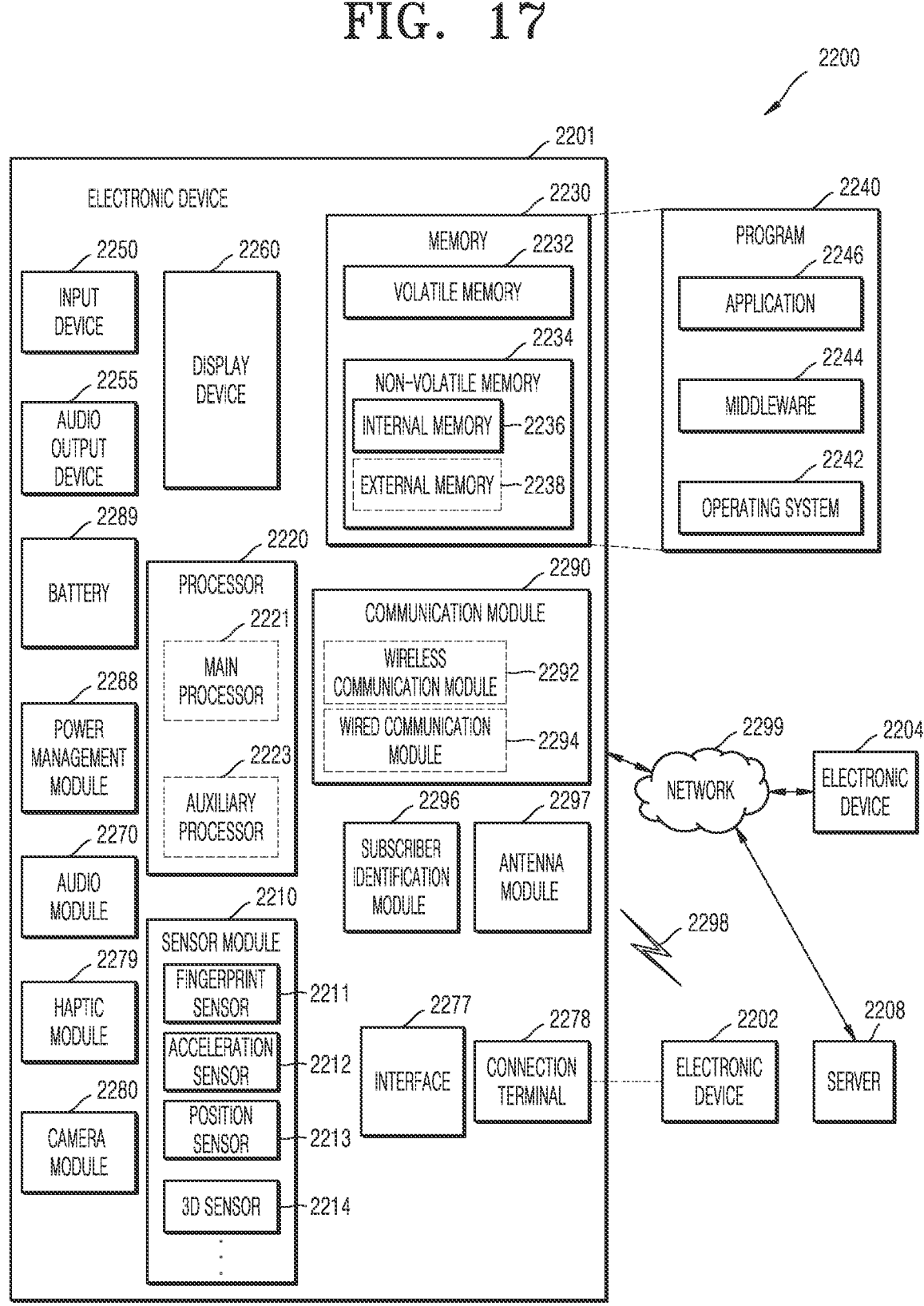
FIG. 17 is a schematic block diagram of a configuration of an electronic device according to an example embodiment.

FIG. 17 is a schematic block diagram of a configuration of an electronic device 2201 according to an example embodiment.

Referring to FIG. 17, in a network environment 2200, the electronic device 2201 may communicate with another electronic device 2202 through a first network 2298 (a short-range wireless communication network, and the like), or another electronic device 2204 and/or a server 2208 through a second network 2299 (a long-range wireless communication network, and the like). The electronic device 2201 may communicate with the electronic device 2204 through the server 2208. The electronic device 2201 may include a processor 2220, a memory 2230, an input device 2250, an audio output device 2255, a display device 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. In the electronic device 2201, some of the constituent elements (the display device 2260, and the like) may be omitted or another constituent element may be added. Some of these constituent elements may be implemented as one integrated circuit. For example, a fingerprint sensor 2211, an iris sensor, an illuminance sensor, and the like of the sensor module 2210 may be implemented by being embedded in the display device 2260 (a display, and the like).

The processor 2220 may control, by executing software (a program 2240, and the like), one or a plurality of other constituent elements (a hardware or software constituent element, and the like) of the electronic device 2201, and perform various data processing or operations. As part of data processing or operations, the processor 2220 may load commands and/or data received from other constituent elements (the sensor module 2210, the communication module 2290, and the like) in a volatile memory 2232, process the command and/or data stored in the volatile memory 2232, and store resultant data in a non-volatile memory 2234. The processor 2220 may include a main processor 2221 (a central processing unit, an application processor, and the like) and an auxiliary processor 2223 (a graphics processing unit, an image signal processor, a sensor hub processor, a communication processor, and the like), which are operable independently or together. The auxiliary processor 2223 may consume less power than the main processor 2221 and may perform a specialized function.

The auxiliary processor 2223 may control functions and/or states related to some constituent elements (the display device 2260, the sensor module 2210, the communication module 2290, and the like) of the electronic device 2201, instead of the main processor 2221 when the main processor 2221 is in an inactive state (a sleep state), or with the main processor 2221 when the main processor 2221 is in an active state (an application execution state). The auxiliary processor 2223 (an image signal processor, a communication processor, and the like) may be implemented as a part of functionally related other constituent elements (the camera module 2280, the communication module 2290, and the like).

The memory 2230 may store various pieces of data needed for constituent element (the processor 2220, the sensor module 2210, and the like) of the electronic device 2201. The data may include, for example, software (the program 2240, and the like) and input data and/or output data regarding commands related thereto. The memory 2230 may include the volatile memory 2232 and/or the non-volatile memory 2234.

The program 2240 may be stored as software in the memory 2230, and may include an operating system 2242, a middleware 2244, and/or an application 2246.

The input device 2250 may receive commands and/or data to be used in the constituent elements (the processor 2220, and the like) of the electronic device 2201, from the outside (a user, and the like) of the electronic device 2201. The input device 2250 may include a microphone, a mouse, a keyboard, and/or a digital pen (a stylus pen, and the like).

The audio output device 2255 may output an audio signal to the outside of the electronic device 2201. The audio output device 2255 may include a speaker and/or a receiver. The speaker may be used for general purposes such as multimedia playback or recording playback, and the receiver may be used to receive incoming calls. The receiver may be combined as a part of the speaker or implemented as an independent separate device.

The display device 2260 may visually provide information to the outside of the electronic device 2201. The display device 2260 may include a display, a hologram device, or a projector, and a control circuit for controlling such a device. The display device 2260 may include a touch circuitry set to sense a touch, and/or a sensor circuit (a pressure sensor, and the like) set to measure the strength of a force generated by the touch.

The audio module 2270 may convert sound into an electrical signal or reversely an electrical signal into sound. The audio module 2270 may obtain sound through the input device 2250, or output sound through the audio output device 2255 and/or a speaker and/or a headphone of another electronic device (the electronic device 2202, and the like) connected to the electronic device 2201 in a wired or wireless manner.

The sensor module 2210 may sense an operation state (power, a temperature, and the like) of the electronic device 2201, or an external environment state (a user state, and the like), and generate an electrical signal and/or data value corresponding to a sensed state. The sensor module 2210 may include the fingerprint sensor 2211, an acceleration sensor 2212, a position sensor 2213, a 3D sensor 2214, and the like, and further include an iris sensor, a gyro sensor, a barometric pressure sensor, a magnetic sensor, a grip sensor, a proximity sensor, a color sensor, an infrared (IR) sensor, a biometric sensor, a temperature sensor, a humidity sensor, and/or an illuminance sensor.

The 3D sensor 2214 may sense a shape, a movement, and the like of an object by radiating light to the object and analyzing light reflected from the object, and may include any one of the phase modulators the above-described embodiments.

The interface 2277 may support one or more designated protocols to be used for connecting the electronic device 2201 to another electronic device (the electronic device 2202, and the like) in a wired or wireless manner. The interface 2277 may include a high definition multimedia interface (HDMI), a universal serial bus (USB) interface, an SD card interface, and/or an audio interface.

A connection terminal 2278 may include a connector for physically connecting the electronic device 2201 to another electronic device (the electronic device 2202, and the like). The connection terminal 2278 may include an HDMI connector, a USB connector, an SD card connector, and/or an audio connector (a headphone connector, and the like).

The haptic module 2279 may convert electrical signals into mechanical stimuli (vibrations, movements, and the like) or electrical stimuli that are perceivable by a user through tactile or motor sensations. The haptic module 2279 may include a motor, a piezoelectric device, and/or an electrical stimulation device.

The camera module 2280 may capture a still image and a video. The camera module 2280 may include a lens assembly including one or a plurality of lenses, image sensors, image signal processors, and/or flashes. The lens assembly included in the camera module 2280 may collect light emitted from an object that is a target for image capturing, and the lens assembly may include any one of the phase modulators according to the above-described embodiments.

The power management module 2288 may manage power supplied to the electronic device 2201. The power management module 2288 may be implemented as a part of a power management integrated circuit (PMIC).

The battery 2289 may supply power to the constituent elements of the electronic device 2201. The battery 2289 may include non-rechargeable primary cells, rechargeable secondary cells, and/or fuel cells.

The communication module 2290 may establish a wired communication channel and/or a wireless communication channel between the electronic device 2201 and another electronic device (the electronic device 2202, the electronic device 2204, the server 2208, and the like), and support a communication through an established communication channel. The communication module 2290 may be operated independently of the processor 2220 (the application processor, and the like), and may include one or a plurality of communication processors supporting a wired communication and/or a wireless communication. The communication module 2290 may include a wireless communication module 2292 (a cellular communication module, a short-range wireless communication module, a global navigation satellite system (GNSS) communication module, and the like) and/or a wired communication module 2294 (a local area network (LAN) communication module, a power line communication module, and the like). Among the above communication modules, a corresponding communication module may communicate with another electronic device through the first network 2298 (a short-range communication network such as Bluetooth, WiFi Direct, or infrared data association (IrDA)) or the second network 2299 (a long-range communication network such as a cellular network, the Internet, or a computer network (LAN, WAN, and the like)). These various types of communication modules may be integrated into one constituent element (a single chip, and the like), or may be implemented as a plurality of separate constituent elements (multiple chips). The wireless communication module 2292 may verify and authenticate the electronic device 2201 in a communication network such as the first network 2298 and/or the second network 2299 by using subscriber information (an international mobile subscriber identifier (IMSI), and the like) stored in the subscriber identification module 2296.

The antenna module 2297 may transmit signals and/or power to the outside (another electronic device, and the like) or receive signals and/or power from the outside. An antenna may include an emitter formed in a conductive pattern on a substrate (a printed circuit board (PCB), and the like). The antenna module 2297 may include one or a plurality of antennas. When the antenna module 2297 includes a plurality of antennas, the communication module 2290 may select, from among the antennas, an appropriate antenna for a communication method used in a communication network such as the first network 2298 and/or the second network 2299. Signals and/or power may be transmitted or received between the communication module 2290 and another electronic device through the selected antenna. Other parts (an RFIC, and the like) than the antenna may be included as a part of the antenna module 2297.

Some of the constituent elements may be connected to each other through a communication method between peripheral devices (a bus, general purpose input and output (GPIO), a serial peripheral interface (SPI), a mobile industry processor interface (MIPI), and the like) and may mutually exchange signals (commands, data, and the like).

The command or data may be transmitted or received between the electronic device 2201 and the external electronic device 2204 through the server 2208 connected to the second network 2299. The electronic devices 2202 and 2204 may be of a type that is the same as or different from the electronic device 2201. All or a part of operations executed in the electronic device 2201 may be executed in one or a plurality of the electronic devices (2202, 2204, and 2208). For example, when the electronic device 2201 needs to perform a function or service, the electronic device 2201 may request one or a plurality of electronic devices to perform part of the whole of the function or service, instead of performing the function or service. The one or a plurality of the electronic devices receiving the request may perform additional function or service related to the request, and transmit a result of the performance to the electronic device 2201. To this end, cloud computing, distributed computing, and/or client-server computing technology may be used.

Figure 18:
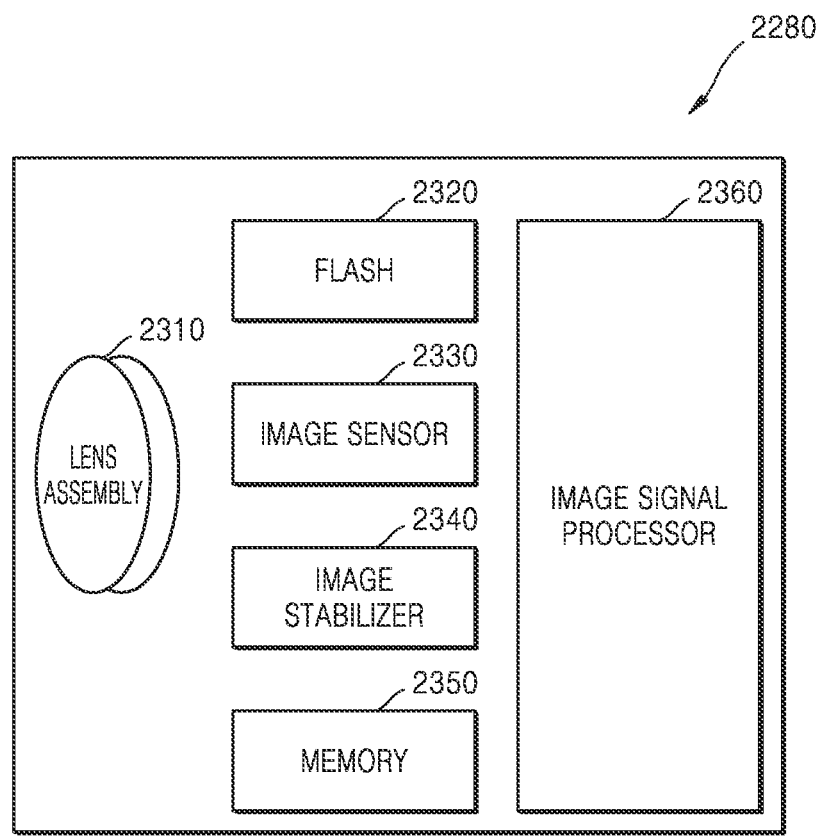
FIG. 18 is a schematic block diagram of a configuration of a camera module provided in the electronic device of FIG. 17.

FIG. 18 is a schematic block diagram of a configuration of the camera module 2280 provided in the electronic device 2201 of FIG. 17.

Referring to FIG. 18, the camera module 2280 may include a lens assembly 2310, a flash 2320, an image sensor 2330, an image stabilizer 2340, a memory 2350 (a buffer memory, and the like), and/or an image signal processor 2360. The lens assembly 2310 may collect light emitted from an object for image capturing, and may include any one of the above-described phase modulators. The lens assembly 2310 may include one or more refraction lenses and phase modulators. The phase modulator equipped in the lens assembly 2310 may have a certain phase profile and a compensation structure, thereby enabling design of a lens with decreasing phase discontinuity. The lens assembly 2310 equipped with the phase modulator may implement a desired optical performance and a short optical overall length.

In addition, the camera module 2280 may further include an actuator. The actuator may drive a position of lens elements forming the lens assembly 2310 and adjust a separation distance between the lens elements, for example, for zooming and/or autofocus (AF).

The camera module 2280 may include a plurality of lens assemblies 2310, and in this case, the camera module 2280 may include a dual camera, a 360 degrees camera, or a spherical camera. Some of the lens assemblies 2310 may have the same lens attributes (a viewing angle, a focal length, auto focus, F Number, optical zoom, and the like), or other lens attributes. The lens assembly 2310 may include a wide angle lens or a telescopic lens.

The flash 2320 may emit light used to reinforce light emitted or reflected from the object. The flash 2320 may include one or a plurality of light-emitting diodes (a red-green-blue (RGB) LED, a white LED, an infrared LED, an ultraviolet LED, and the like), and/or a xenon lamp. The image sensor 2330 may convert light emitted or reflected from the object and transmitted through the lens assembly 2310 into electrical signals, thereby obtaining an image corresponding to the object. The image sensor 2330 may include one or a plurality of sensors selected from image sensors having different attributes such as an RGB sensor, a black and white (BW) sensor, an IR sensor, or UV sensor. Each sensor included in the image sensor 2330 may be implemented by a charged coupled device (CCD) sensor and/or a complementary metal oxide semiconductor (CMOS) sensor.

The image stabilizer 2340 may move, in response to a movement of the camera module 2280 or an electronic device including the same, one or a plurality of lenses included in the lens assembly 2310 or the image sensor 2330 in a particular direction or may compensate a negative effect due to the movement by controlling (adjusting a read-out timing, and the like) the movement characteristics of the image sensor 2330. The image stabilizer 2340 may detect a movement of the camera module 2280 or the electronic device 2201 by using a gyro sensor (not shown) or an acceleration sensor (not shown) arranged inside or outside the camera module 2280. The image stabilizer 2340 may be implemented in an optical form.

The memory 2350 may store a part or entire data of an image obtained through the image sensor 2330 for a subsequent image processing operation. For example, when a plurality of images are obtained at high speed, only low resolution images are displayed while the obtained original data (Bayer-Patterned data, high resolution data, and the like) is stored in the memory 2350. Then, the memory 2350 may be used to transmit the original data of a selected (user selection, and the like) image to the image signal processor 2360. The memory 2350 may be incorporated into the memory 2230 of the electronic device 2201, or configured to be an independently operated separate memory.

The image signal processor 2360 may perform one or more image processing on the image obtained through the image sensor 2330 or the image data stored in the memory 2350. The image processing may include depth map generation, three-dimensional modeling, panorama generation, feature point extraction, image synthesis, and/or image compensation (noise reduction, resolution adjustment, brightness adjustment, blurring, sharpening, softening, and the like). The image signal processor 2360 may perform control (exposure time control, or read-out timing control, and the like) on constituent elements (the image sensor 2330, and the like) included in the camera module 2280. The image processed by the image signal processor 2360 may be stored again in the memory 2350 for additional processing or provided to external constituent elements (the memory 2230, the display apparatus 2260, the electronic device 2202, the electronic device 2204, the server 2208, and the like) of the camera module 2280. The image signal processor 2360 may be incorporated into the processor 2220, or configured to be a separate processor operated independently of the processor 2220. When the image signal processor 2360 is configured by a separate processor from the processor 2220, the image processed by the image signal processor 2360 may undergo additional image processing by the processor 2220 and then displayed through the display apparatus 2260.

The electronic device 2201 may include a plurality of camera modules 2280 having different attributes or functions. In this case, one of the camera modules 2280 may be a wide angle camera, and another may be a telescopic camera. Similarly, one of the camera modules 2280 may be a front side camera, and another may be a read side camera.

Figure 19:
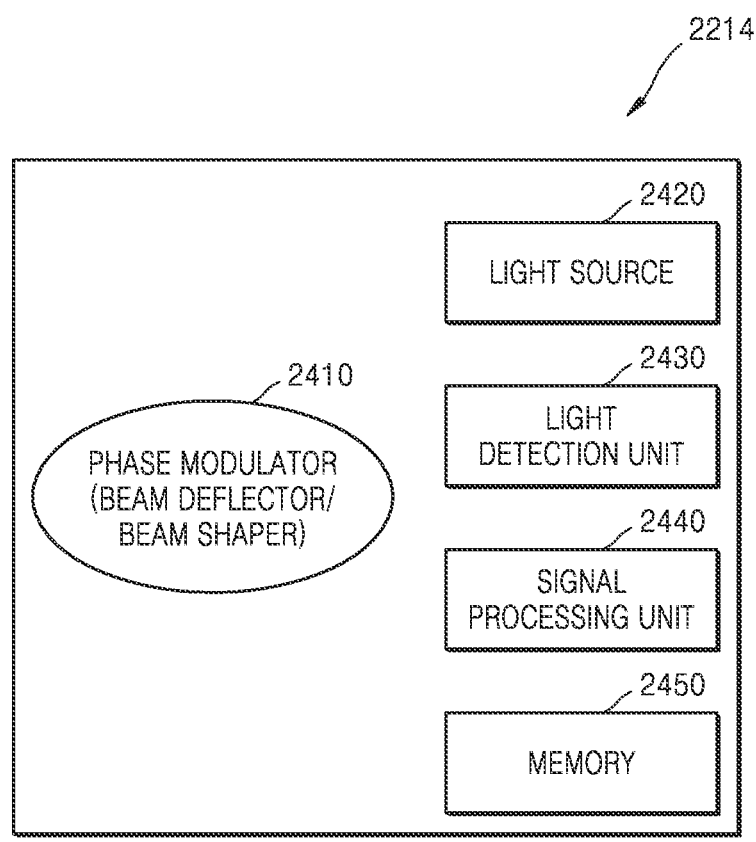
FIG. 19 is a schematic block diagram of a configuration of a 3D sensor provided in the electronic device of FIG. 17.

FIG. 19 is a schematic block diagram of a configuration of a 3D sensor 2214 provided in the electronic device of FIG. 17.

Referring to FIG. 19, the 3D sensor 2214 may sense a shape, a movement, and the like of an object by radiating light to the object and receiving and analyzing the light reflected from the object. The 3D sensor 2214 may include a light source 2420, a phase modulator 2410, a light detection unit 2430, a signal processing unit 2440, and a memory 2450. Any one of the phase modulators according to the above-described embodiments may be employed as the phase modulator 2410, and a target phase delay profile may be set so that the phase modulator 2410 functions as a beam deflector or a beam shaper.

The light source 2420 radiates light to be used for analyze the shape or position of an object. The light source 2420 may include a light source for generating and radiating light of a certain wavelength. The light source 2420 may include a light source, such as a laser diode (LD), a light emitting diode (LED), a super luminescent diode (SLD), and the like, which generates and radiates light in a wavelength band suitable for analysis of the position and shape of an object, for example, light in an infrared wavelength band. The light source 2420 may include a wavelength variable laser diode. The light source 2420 may generate and radiate light in a plurality of wavelength bands different from each other. The light source 2420 may generate and radiate pulse light or continuous light.

The phase modulator 2410 modulates the light radiated from the light source 2420 and transmits the modulated light to the object. When the phase modulator 2410 is a beam deflector, the phase modulator 2410 may defect incident light in a certain direction to travel toward the object. When the phase modulator 2410 is a beam shaper, the phase modulator 2410 may modulate incident light so that the incident light has a distribution having a certain pattern. The phase modulator 2410 may form structured light suitable for three-dimensional shape analysis.

The phase modulator 2410, as described above, may set a phase delay distribution ($\partial\varphi/\partial\lambda$) to 0, a positive number, or a negative number, and implement a continuous phase delay profile. Accordingly, the phase modulator 2410 may perform an (achromatic) light modulation having no deviation according to a wavelength. Reversely, the phase modulator 2410 may enable irradiation of the light to the object with a varied deflection direction for each wavelength or a different beam pattern according to a wavelength, by reinforcing deviation according to the wavelength.

A light detection unit 2430 may receive reflected light of the light radiated to the object via the phase modulator 2410. The light detection unit 2430 may include an array of a plurality of sensors or only one sensor for sensing light.

The signal processing unit 2440 may process a signal sensed by the light detection unit 2430 and analyze the shape, and the like of the object. The signal processing unit 2440 may analyze a three-dimensional shape of the object including a depth position.

For analysis of a three-dimensional shape, an operation to measure a time of flight may be performed. Various operation methods may be used for measurement of time of flight. For example, a direct time measurement method is to obtain a distance by measuring a time of pulse light that is projected to an object and returned after being reflected from the object. A correlation method is to measure a distance from brightness of pulse light that is projected to an object and returned after being reflected from the object. A phase delay measurement method is a method that projects continuous wave light such as a sine wave to an object, detects a phase difference of light reflected from the object, and converts the phase difference into a distance.

When structured light is radiated to an object, a depth position of the object may be operated from a pattern change of the structured light reflected from the object, that is, a result of comparison with incident structured light pattern. Depth information of an object may be extracted by tracking a pattern change for each coordinate of the structured light reflected from the object, and three-dimensional information related to the shape, a movement, and the like of the object may be extracted from the extracted depth information.

The memory 2450 may store programs and other data necessary for the operation of the signal processing unit 2440.

An operation result of the signal processing unit 2440, that is, information about the shape, position, and the like of the object may be transmitted to other unit in the electronic device 2201 or to another electronic device. For example, such information may be used by the application 2246 stored in the memory 2230. Another electronic device to which the result is transmitted may include a display device or a printer that outputs the result. In addition, another electronic device may include autonomous driving devices such as driverless cars, autonomous cars, robots, drones, and the like, smart phones, smart watches, mobile phones, PDAs, laptops, PCs, various wearable devices, other mobile or non-mobile computing devices, and IoT devices, but the disclosure is not limited thereto.

Figure 20:
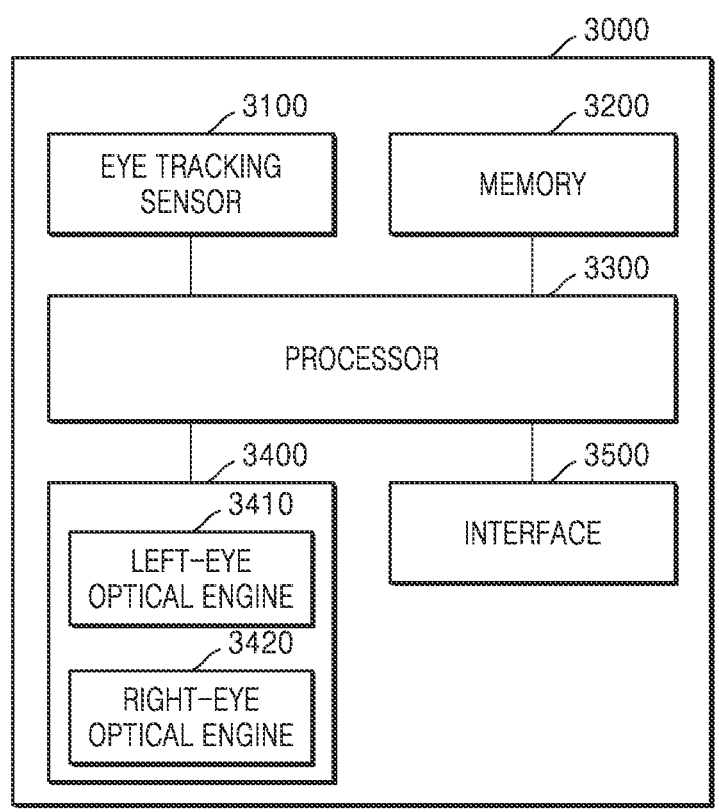
FIG. 20 is a schematic block diagram of a configuration of an electronic device according to an example embodiment.

FIG. 20 is a schematic block diagram of a configuration of an electronic device 3000 according to an embodiment.

Referring to FIG. 20, the electronic device 3000 may be provided. The electronic device 3000 may include an AR device. For example, the electronic device 3000 may include a glasses-type AR device. The electronic device 3000 may include a display engine 3400, a processor 3300, an eye tracking sensor 3100, an interface 3500, and a memory 3200.

The processor 3300 may control an overall operation of an AR device including the display engine 3400 by driving an operating system or an application program, and perform processing and operations of various data including image data. For example, the processor 3300 may process image data including a left-eye virtual image and a right-eye virtual image rendered to have binocular disparity.

The interface 3500, through which data or operation commands from the outside is input/output, may include, for example, a user interface such as a touch pad, a controller, an operation button, and the like, which is operable by a user. The interface 3500 may include a wired communication module such as a USB module or a wireless communication module such as Bluetooth, and may receive user operation information or virtual image data transmitted from an interface included in an external device through these modules.

A memory 3200 may include an internal memory such as a volatile memory or a non-volatile memory. The memory 3200 may store various data, programs or applications that drive and control an AR device, and input/output signals or data of virtual images, under the control of the processor 3300.

The display engine 3400 is configured to receive image data generated from the processor 3300 and generate light of a virtual image, and may include a left-eye optical engine 3410 and a right-eye optical engine 3420. Each of the left-eye optical engine 3410 and the right-eye optical engine 3420 may include a light source for outputting light and a display panel for forming a virtual image by using the light output from the light source, and have a function as a compact projector. The light source may be implemented by, for example, an LED, and the display panel may be implemented by, for example, liquid crystal on silicon (LCoS).

The eye tracking sensor 3100 may be installed at a position where a pupil of a user wearing an AR device is trackable, and may transmit a signal corresponding to user's gaze information to the processor 3300. As such, the eye tracking sensor 3100 may detect gaze information such as the direction of the user's eye, the position of the pupil of the user's eye or the coordinates of a center point of the pupil, and the like. The processor 3300 may detect the form of an eye movement based on the user's gaze information detected by the eye tracking sensor 3100. For example, the processor 3300 may determine gaze information in various forms including fixation of gazing any one point, pursuit of chasing a moving object, saccade of quickly moving gaze from one point to another point, and the like, based on the gaze information obtained from the eye tracking sensor 3100.

Figure 21:
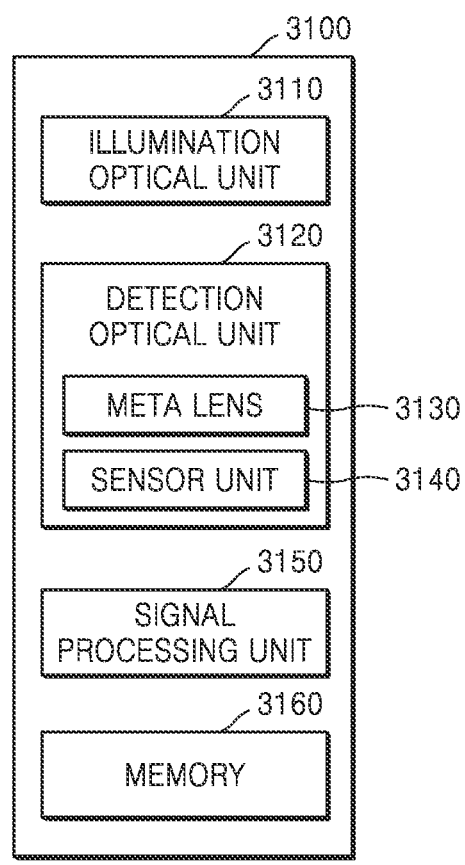
FIG. 21 is a schematic block diagram of an eye tracking sensor provided in the electronic device of FIG. 20.

FIG. 21 is a schematic block diagram of the eye tracking sensor 3100 provided in the electronic device 3000 of FIG. 20.

The eye tracking sensor 3100 may include an illumination optical unit 3110, a detection optical unit 3120, a signal processing unit 3150, and a memory 3160. The illumination optical unit 3110 may include a light source for radiating light, for example, infrared light, to a position of an object (a user's eye). The detection optical unit 3120 for detecting reflected light may include a meta lens 3130 and a sensor unit 3140. The signal processing unit 3150 may operate the position of a pupil of a user's eye and the like from a result of the sensing by the detection optical unit 3120.

Any one of the phase modulators and the phase modulator arrays according to the above-described embodiments, a combination thereof, or a modified example thereof may be used as the meta lens 3130. The meta lens 3130 may focus light from the object at the sensor unit 3140. In the eye tracking sensor 3100 located very close to the user's eye, an incident light of light incident on the sensor unit 3140 may be, for example, 30° or more. The meta lens 3130 has a structure including a compensation area, and a decrease in efficiency is reduced even for light having a large incident angle. Accordingly, accuracy of gaze tracking may be increased.

The electronic device, which is used not only as an AR device but also as a VR device, may track a user's gaze to a VR image provided by the above device.

Example embodiments may provide a phase modulator and a phase modulator array which stably maintain an over-coupling state.

Example embodiments may provide a phase modulator and a phase modulator array, which have improved light reflection properties.

Example embodiments may provide a phase modulator and a phase modulator array, which have a degree of freedom with respect to a distance between an antenna pattern and a phase change material pattern.

However, the effects of the disclosure are not limited to the contents disclosed herein.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. A phase modulator comprising:
an antenna pattern;
a lower reflective layer spaced apart from the antenna pattern in a vertical direction;
a spacer provided between the antenna pattern and the lower reflective layer, wherein the spacer comprises a first material; and
a phase shift pattern included in the spacer, the phase shift pattern comprising a phase shift material that is different from the first material,
wherein the spacer is provided on an upper surface, a lower surface and a first and second side of the phase shift pattern.

2. The phase modulator of claim 1, wherein the phase shift pattern is surrounded by the spacer.

3. The phase modulator of claim 1, wherein a thickness in the vertical direction of a part of the spacer disposed between the phase shift pattern and the antenna pattern is greater than a thickness in the vertical direction of another part of the spacer disposed between the phase shift pattern and the lower reflective layer.

4. The phase modulator of claim 1, wherein the phase shift pattern overlaps the antenna pattern in the vertical direction.

5. The phase modulator of claim 1, wherein the phase shift pattern is disposed in an effective resonator area in the spacer configured to generate a gap plasmon.

6. The phase modulator of claim 1,
wherein a width of the antenna pattern in a horizontal direction perpendicular to the vertical direction ranges from 50 nm to 2000 nm.

7. The phase modulator of claim 1, wherein a width of the phase shift pattern in a horizontal direction perpendicular to the vertical direction is the same as a width of the antenna pattern in the horizontal direction.

8. The phase modulator of claim 1, further comprising a power source configured to apply a voltage to the antenna pattern,
wherein the antenna pattern is configured to generate heat based on the voltage being applied to the antenna pattern.

9. The phase modulator of claim 8, wherein the phase shift pattern is spaced apart from the antenna pattern such that a difference between a highest temperature of the phase shift pattern and a lowest temperature of the phase shift pattern is minimal based on the heat being generated from the antenna pattern.

10. The phase modulator of claim 8, wherein, based on the heat being generated from the antenna pattern, the phase shift pattern is spaced apart from the antenna pattern such that a lowest temperature of the phase shift pattern is greater than or equal to 280° C.

11. The phase modulator of claim 1, wherein the antenna pattern comprises a plurality of antenna patterns disposed in a horizontal direction perpendicular the vertical direction, the phase shift pattern comprises a plurality of phase shift patterns disposed between the plurality of antenna patterns and the lower reflective layer, the plurality of antenna patterns have a same shape, and the plurality of phase shift patterns are disposed in the horizontal direction.

12. The phase modulator of claim 11, further comprising a power source configured to respectively apply a same voltage to the plurality of antenna patterns,
wherein the plurality of antenna patterns are configured to generate heat based on the voltage being applied to the plurality of antenna patterns.

13. A phase modulator array comprising:
a first phase modulator;
a second phase modulator spaced apart from the first phase modulator in a horizontal direction;
a first power source configured to apply a voltage to the first phase modulator; and
a second power source configured to apply a voltage to the second phase modulator,
wherein each of the first phase modulator and the second phase modulator comprises:
antenna patterns disposed in the horizontal direction;
a lower reflective layer spaced apart from the antenna patterns in a vertical direction perpendicular to the horizontal direction;
a spacer provided between the antenna patterns and the lower reflective layer, wherein the spacer comprises a first material; and
phase shift patterns included in the spacer and disposed in the horizontal direction, the phase shift patterns respectively comprising a phase shift material that is different from the first material, and
wherein the spacer is provided on an upper surface, a lower surface and a first and second side of the phase shift pattern.

14. The phase modulator array of claim 13, wherein the first power source is further configured to apply a first voltage to the antenna patterns included in the first phase modulator, the second power source is configured to apply a second voltage to the antenna patterns included in the second phase modulator, and
wherein the first voltage and the second voltage are independent of each other.

15. The phase modulator array of claim 13, wherein a number of the phase shift patterns included in the first phase modulator is the same as a number of the phase shift patterns included in the second phase modulator.

16. The phase modulator array of claim 13, wherein the spacer included in the first phase modulator and the spacer included in the second phase modulator are different parts of one dielectric film.

17. The phase modulator array of claim 13, further comprising a trench provided between the first phase modulator and the second phase modulator,
wherein the trench exposes the lower reflective layer.

18. The phase modulator array of claim 17, further comprising an insulation pattern provided in the trench,
wherein a thermal conductivity of the insulation pattern is lower than a thermal conductivity of the spacer.

19. The phase modulator array of claim 13, wherein, in each of the first phase modulator and the second phase modulator, the phase shift patterns is surrounded by the spacer.

20. The phase modulator array of claim 19, wherein, in each of the first phase modulator and the second phase modulator, a thickness in the vertical direction of a part of the spacer disposed between the phase shift patterns and the antenna patterns is greater than a thickness in the vertical direction of another part of the spacer disposed between the phase shift patterns and the lower reflective layer.

* * * * *